(12) United States Patent
Ishikawa et al.

(10) Patent No.: US 8,289,229 B2
(45) Date of Patent: Oct. 16, 2012

(54) HEAD-UP DISPLAY APPARATUS

(75) Inventors: Toshiki Ishikawa, Ichinomiya (JP); Hiroshi Ando, Nagoya (JP); Takayuki Fujikawa, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 822 days.

(21) Appl. No.: 12/056,946

(22) Filed: Mar. 27, 2008

(65) Prior Publication Data

US 2008/0238814 A1 Oct. 2, 2008

(30) Foreign Application Priority Data

Mar. 29, 2007 (JP) .................................. 2007-88939
Feb. 8, 2008 (JP) .................................. 2008-29074

(51) Int. Cl.
*G09G 5/00* (2006.01)

(52) U.S. Cl. ............... 345/7; 359/13; 359/629; 359/630

(58) Field of Classification Search .................. 345/7–8; 359/13–14, 629, 633
See application file for complete search history.

(56) References Cited

U.S. PATENT DOCUMENTS 4,978,214 A * 12/1990 Kawata .......................... 353/114
5,436,763 A    7/1995 Chen et al.
5,760,931 A * 6/1998 Saburi et al. ...................... 359/13
6,989,934 B2 * 1/2006 Aoki et al. ...................... 359/629
2002/0084950 A1 * 7/2002 Aoki et al. ........................... 345/7
2007/0229394 A1 10/2007 Ishikawa et al.
2008/0049331 A1  2/2008 Nakamura et al.

FOREIGN PATENT DOCUMENTS

JP       2002-202475       7/2002

OTHER PUBLICATIONS

Japanese Office Action dated Mar. 10, 2009, issued in corresponding Japanese Application No. 2008-029074, with English translation.
German Office Action dated Jul. 24, 2008 issued in counterpart German Application 10 2008 015 997.2-51 with English translation.
German Office Action dated Oct. 26, 2010, issued in corresponding German Application No. 10 2008 015 997.2-51, with English translation.
German Official Action issued for corresponding German Patent Application No. 10 2008 015 997.2, dated Feb. 29, 2012.

* cited by examiner

*Primary Examiner* — Seokyun Moon
(74) *Attorney, Agent, or Firm* — Nixon & Vanderhye P.C.

(57) ABSTRACT

A head-up display apparatus allows an occupant of a vehicle to visually perceive a virtual image of an image light reflected by a windshield after passing through a cylindrical lens. The cylindrical lens is inclined against the image light to thereby reflect outside light not to reach an eye range of the occupant. The cylindrical lens is placed in a light guide portion such that (i) an action axis direction for an optical action and (ii) a horizontal direction in the display image agree with each other. Of the cylindrical lens, an inclination angle and installation depth are so set that light incident at an angle equal to or greater than an interception upper-limit incident angle and reflected by a pass-through side of the cylindrical lens does not arrive at the eye range of the occupant.

13 Claims, 22 Drawing Sheets

HEAD-UP DISPLAY APPARATUS

CROSS REFERENCE TO RELATED APPLICATION

This application is based on and incorporates herein by reference Japanese Patent Applications No. 2007-88939 filed on Mar. 29, 2007, and No. 2008-029074 filed on Feb. 8, 2008.

FIELD OF THE INVENTION

The present invention relates to a head-up display apparatus provided in a movable body, such as a vehicle or automobile.

BACKGROUND OF THE INVENTION

There has been a conventionally known head-up display apparatus (hereafter, referred to as HUD apparatus) installed in a movable body (hereafter, referred to as vehicle), such as an automobile. The HUD apparatus is so constructed that the following is implemented: varied information is projected as an image light from an image projector disposed inside the instrument panel of the vehicle; and it is reflected by the inside surface of a windshield so that the driver can visually perceive the varied information as a virtual image (hereafter, referred to as display image).

In general, such an HUD apparatus is so constructed that a display image is displayed in superimposition on the view in front of the vehicle. For the driver to be capable of easily focusing his/her eyes on a display image to visually perceive it, it is important to take the following measure: the display image is projected to a position closest to the front view as much as possible (a position distant from the position of the driver's eyes). For this purpose, it is required to lengthen the distance between the driver who is to visually perceive a display image and the image projector. However, this involves a problem. When the distance between the driver who is to visually perceive a display image and the image projector is simply lengthened, the size of the HUD apparatus itself is increased.

To cope with this, for example, the following measures are taken to shorten the overall length of a HUD apparatus to reduce its size: multiple reflecting mirrors are installed in the optical path between an image projector and a windshield to bend the optical path; a magnifying lens is disposed between an image projector and a windshield to equivalently lengthen the optical path; and the like. (Refer to Patent Document 1, for example.)

FIG. 21 explains the principle on which an optical path can be equivalently lengthened by a common convex lens as a magnifying lens. When an image projector for projecting an image light 100 is disposed between the focal point F of the convex lens C and the convex lens C, the following takes place as illustrated in FIG. 21: the obtained display image 101 is a virtual image and is displayed (i.e., the image is formed) in the same direction as the direction in which the image projector is disposed as viewed from the convex lens C.

It will be assumed that: the distance between the center of the convex lens C and the display image 101 visually perceived by the driver should be b; the distance between the center of the convex lens C and the part of the image projector for projecting the image light 100 be a; and the focal length of the convex lens C be f. Then, the relation expressed by Expression (1) holds between the distance a, distance b, and focal length f.

[Expression 1]

$$\frac{1}{a} - \frac{1}{b} = \frac{1}{f} \quad (1)$$

More specific description will be given. As is apparent from Expression (1), the following can be implemented by lengthening the distance a between the image projector for projecting the image light 100 and the convex lens C within the range from the convex lens C to the focal point F: the distance b to the projection position of the display image can be lengthened, that is, the optical path from the image projector to the driver who is to visually perceive the virtual image can be equivalently lengthened.

In the HUD apparatus, however, the windshield 203 exists between the lens 202 (convex lens C) and the driver and image projector is so disposed that an image light is projected to the windshield 203 from beneath, as illustrated in FIG. 22. That is, the driver visually perceives the image light 100 whose traveling direction has been changed by being reflected by the windshield 203. As a result, the virtual image appears in a position beyond the windshield 203, not under the windshield 203 under which the image projector is positioned.

Patent Document 1: JP 2002-202475 A (corresponding to US 2002/0084950 A1)

However, the HUD apparatus described in Patent Document 1 involves a problem. Depending on the angle at which outside light, such as sunlight 200, comes in, it passes through the windshield 203 and is reflected by the lens 202 and the reflected light 201 can enter the driver's eye range 204 as illustrated in FIG. 23.

As a result, the problem illustrated in FIG. 24 arises. That is, the reflected light 201 is more intense than the light of the display image; therefore, it becomes so intense noise that it is impermissible for drivers and affects the visibility of a display image.

SUMMARY OF THE INVENTION

It is an object of the present invention to provide a head-up display apparatus that is capable of projecting a display image excellent in visibility without being affected by outside light and can be reduced in size.

According to an example of the present invention, a head-up display apparatus is provided as follows. The apparatus is in a movable body having a reflecting element for transmitting and reflecting light. The apparatus allows an occupant of the movable body to visually perceive as a virtual image an image formed of image light reflected by the reflecting element. The apparatus includes the following. An optical element is configured to transmit light while performing an optical action on the light with respect to a preset certain direction. An image projecting element is configured to project an image light to a projecting side of the reflecting element through an incident side and an outgoing side of the optical element, wherein a main optical axis is defined as passing through a center of the projected image light. A light shielding element is configured to intercept part of outside light incident from a non-projecting side of the reflecting element toward the optical element. Herein, in the optical element, a cross section orthogonal to the certain direction has an incident-side intersecting line on the incident side and an outgoing-side intersecting line on the outgoing side. The optical element is so disposed that a normal to the incident-side intersecting line and a normal to the outgoing-side intersecting line are individually inclined with respect to the main optical axis of the image incident on the optical element so that outside light, which arrives at the optical element without being intercepted by the light shielding element and is reflected by the optical element, is thereby directed to outside a visual perception range, in which the image formed of the image light reflected by the reflecting element is allowed to be visually perceived by the occupant.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to embodiments of the present invention with reference to the drawings.

First Embodiment

Configuration

Figure 1:
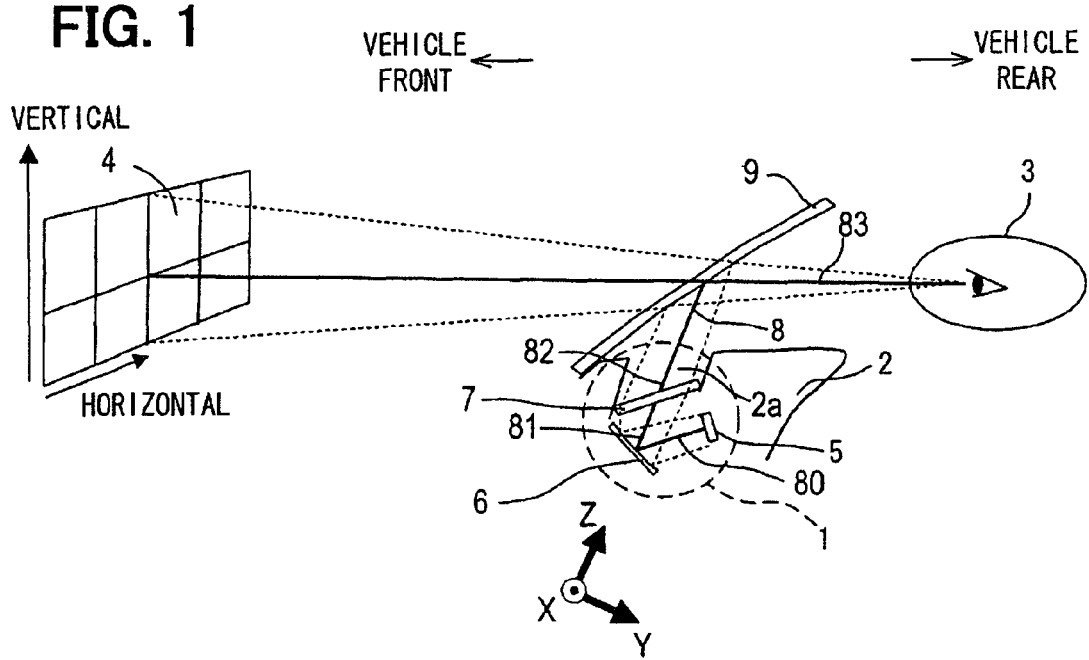
FIG. 1 is a general configuration diagram illustrating how a head-up display apparatus is applied to a vehicle according to a first embodiment of the present invention.
Figure 2:
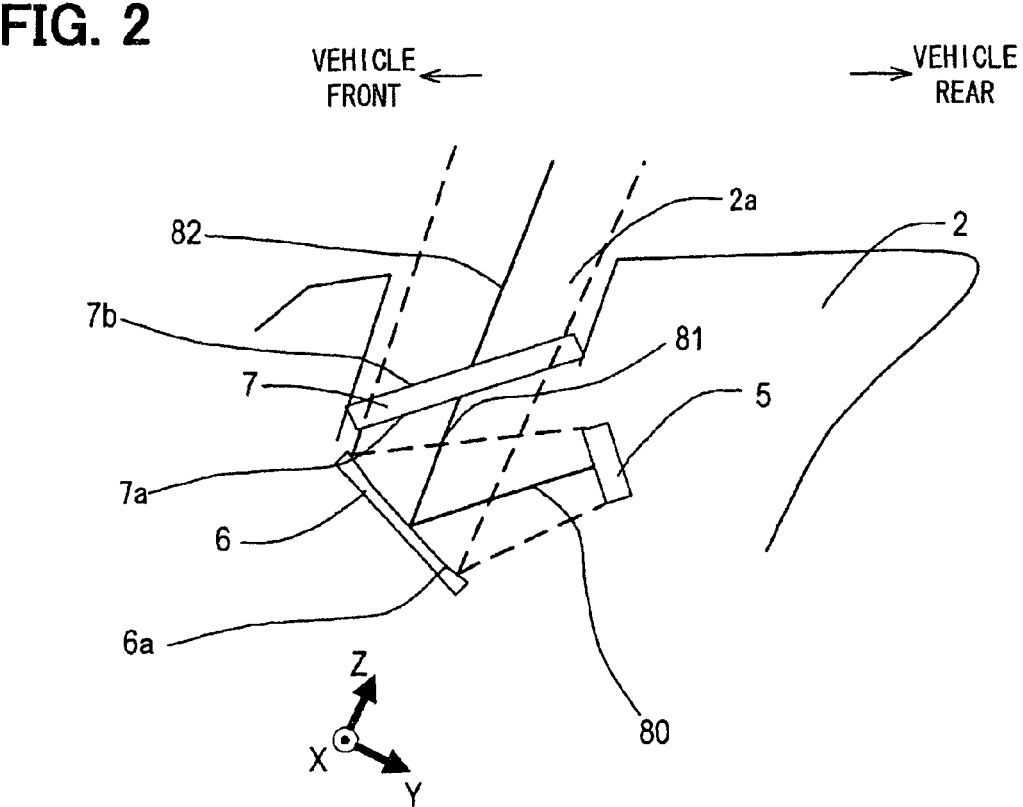
FIG. 2 is an enlarged view illustrating a principal part of a general configuration in which the head-up display apparatus is applied to a vehicle.

FIG. 1 is a general configuration diagram illustrating how a head-up display apparatus (hereafter, referred to as HUD apparatus) in a first embodiment is applied to a subject vehicle; and FIG. 2 is an enlarged view of its principal part.

As illustrated in FIG. 1, the HUD apparatus 1 is disposed inside an instrument panel 2 extended from the lower edge of a windshield 9 toward the interior of a vehicle compartment. It includes: a display device 5 for projecting varied information as an image light (or ray) 80; a free-form mirror 6 for magnifying and reflecting the image light 80 projected from the display device 5; and a cylindrical lens 7 for magnifying and transmitting an image light 81 reflected by the free-form mirror 6.

An image light 82 that passed through the cylindrical lens 7 is reflected by the front windshield 9 and arrives at an eye range 3 (also referred to as a visual perception area) of an occupant of the vehicle. Here, two sides or surfaces of the windshield 9 are referred to as a non-projection side which is outside the vehicle and a projection side which is inside of the vehicle. Thus, the occupant visually perceives a virtual image of an image light 83 as if it were in the position of a display image 4 of the view in front of the vehicle (on the side opposite the occupant with respect to the windshield 9).

In the instrument panel 2, there is formed a cylindrical light guide portion 2a, which has an opening in the upper face of the instrument panel 2 and guides the image light 81 reflected by the free-form mirror 6 to the windshield 9. The cylindrical lens 7 is so disposed that it entirely closes the light guide portion 2a. That is, since the cylindrical lens 7 closes the opening in the light guide portion 2a, it also functions as a cover for shielding the interior of the instrument panel 2 from dust.

The instrument panel 2 (including the inner wall forming the light guide portion 2a) is formed of light shielding resin. That is, the instrument panel 2 is so formed that light incident on its upper face or its inner wall forming the light guide portion 2a is not reflected but it is absorbed.

Hereafter, the various directions will be designated as follows: the traveling direction of a main optical axis 8 or center axis of an image going through the light guide portion 2a (passing through the cylindrical lens 7) is Z-direction; the direction of the width of the vehicle, which is equivalent to a lateral direction of the vehicle, or a horizontal direction in the display image 4 is X-direction; and the direction orthogonal both to the X-direction and to the Z-direction is Y-direction. Further, the lateral direction of the vehicle is naturally orthogonal to a longitudinal direction of the vehicle.

As illustrated in FIG. 2, the surface of the free-form mirror 6 that reflects the image light 80 projected from the display device 5 will be designated as reflection surface 6a; the surface of the cylindrical lens 7 on which the image light 81 reflected by the reflection surface 6a is incident will be designated as an incident side or surface 7a; and the other side or surface of the cylindrical lens 7 from which the image light 82 passing through the cylindrical lens 7 goes out is designated as a pass-through side or surface 7b. Further, the incident side 7a may be referred to as an entering side while the pass-through side 7b may be referred to as an outgoing side or exiting side.

<Configuration and Action of Cylindrical Lens>

The cylindrical lens 7 is a publicly known one that acts as a lens (converges or diverges light with a predetermine degree) only in one of two directions orthogonal to the direction of the thickness of the lens (direction in which light is transmitted).

Figure 3:
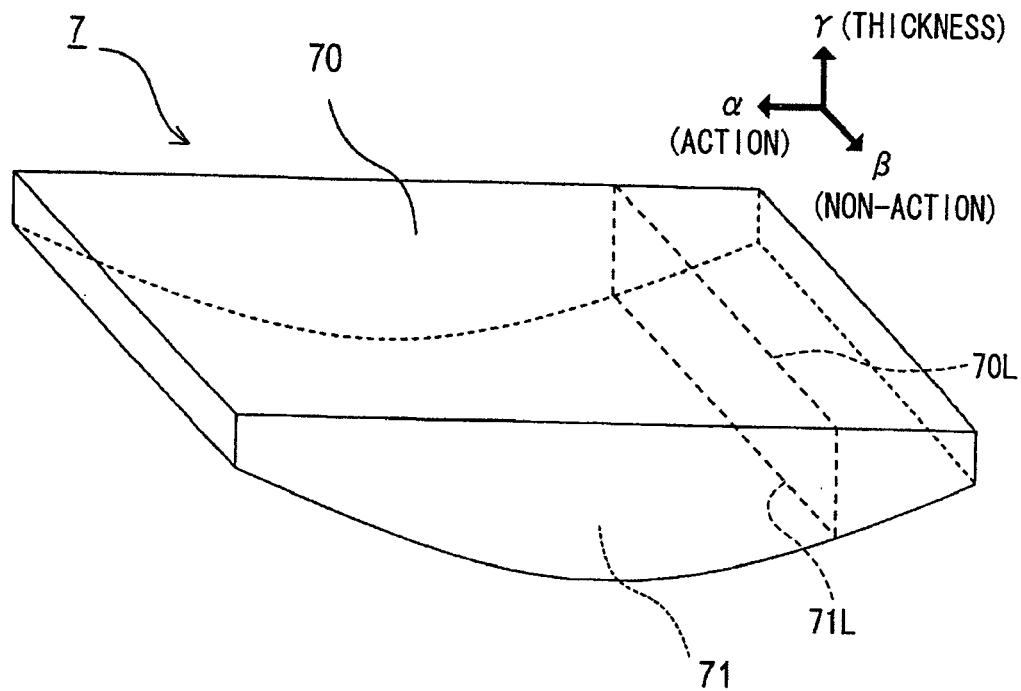
FIG. 3 is a perspective view of a cylindrical lens.

FIG. 3 is a perspective view of a single cylindrical lens 7. Hereafter, as illustrated in the drawing, the direction of the thickness of the lens will be designated as γ-direction; the direction in which it acts as a lens (action axis direction) will be designated as α-direction; and the direction in which it does not act as a lens (non-action axis direction) will be designated as β-direction.

That is, the cylindrical lens 7 is so constructed that: of two surfaces positioned at both ends in the γ-direction, one is a rectangular flat surface 70 and the other is a lens formation surface 71 forming a partial curved surface of a circular cylinder. Moreover, in the cylindrical lens 7, a cross section orthogonal to the α-direction has a first intersecting line 70L and a second intersecting line 71L with the flat surface 70 and the lens formation surface 71, respectively. The first and second intersecting lines are parallel with each other; thus, the cross section is shaped of a rectangle.

Figure 4A:
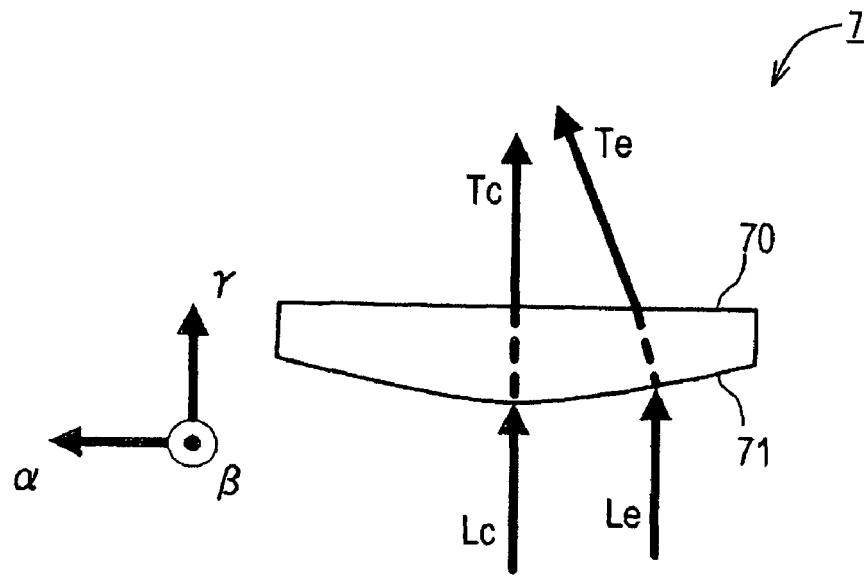
FIG. 4A is an explanatory drawing illustrating a sectional shape of a cylindrical lens and the traveling of light incident on the cylindrical lens.
Figure 4B:
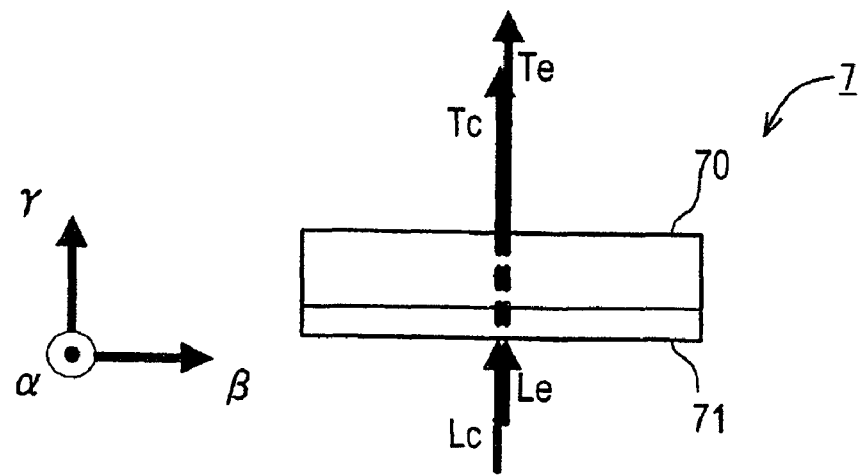
FIG. 4B is another explanatory drawing illustrating a sectional shape of a cylindrical lens and the traveling of light incident on the cylindrical lens.

FIG. 4A illustrates the sectional shape of the cylindrical lens 7 in the α-γ plane and the traveling direction of light incident from the lens formation surface 71 along the γ-direction. FIG. 4B illustrates its sectional shape in the β-γ plane, the traveling direction of light incident from the lens formation surface 71 along the γ-direction, and the traveling direction of the resulting transmitted light.

Vectors illustrated in FIG. 4A will be designated as follows: a vector that represents the traveling direction of incident light in the center position in the α-direction on the lens formation surface 71 is incidence vector Lc; a vector that represents the traveling direction of transmitted light based on this incident light is transmission vector Tc; a vector that represents the traveling direction of incident light in a position, which is distant from the center position in the α-direction on the lens formation surface 71 and which is distant only in the α-direction in the α-β plane, is incidence vector Le; and a vector that represents the traveling direction of transmitted light based on this incident light is transmission vector Te.

As illustrated in the drawings, the cylindrical lens 7 performs an optical action or optical function on the incident light along the γ-direction as follows: it performs an optical action or optical function in the α-direction (in which the transmission vectors Tc and Te are different in direction in the α-γ plane); but it does not have an optical action or optical function in the β-direction (in which the transmission vectors Tc and Te are identical in direction in the β-γ plane).

<Disposition of Cylindrical Lens>

Figure 5:
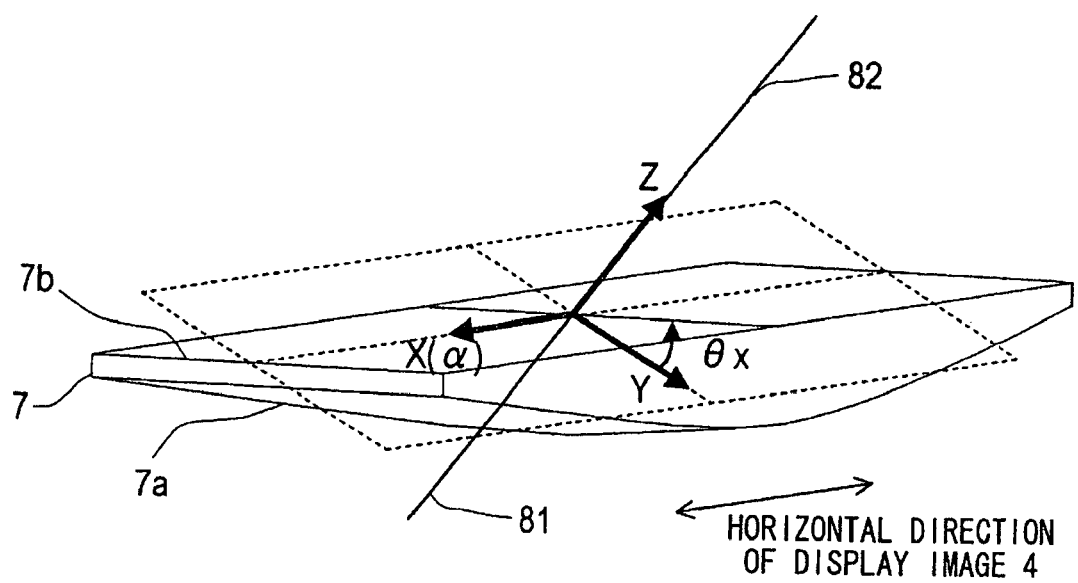
FIG. 5 is a first explanatory drawing illustrating how a cylindrical lens is inclined.
Figure 6A:
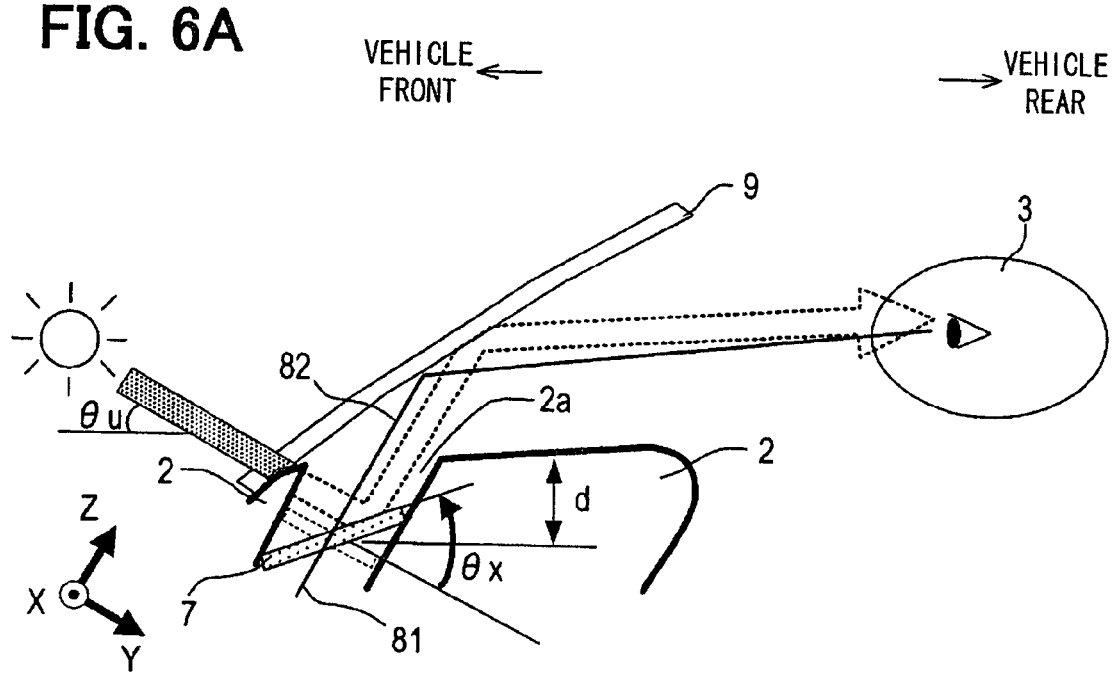
FIG. 6A is an explanatory drawing illustrating how a cylindrical lens is disposed.
Figure 6B:
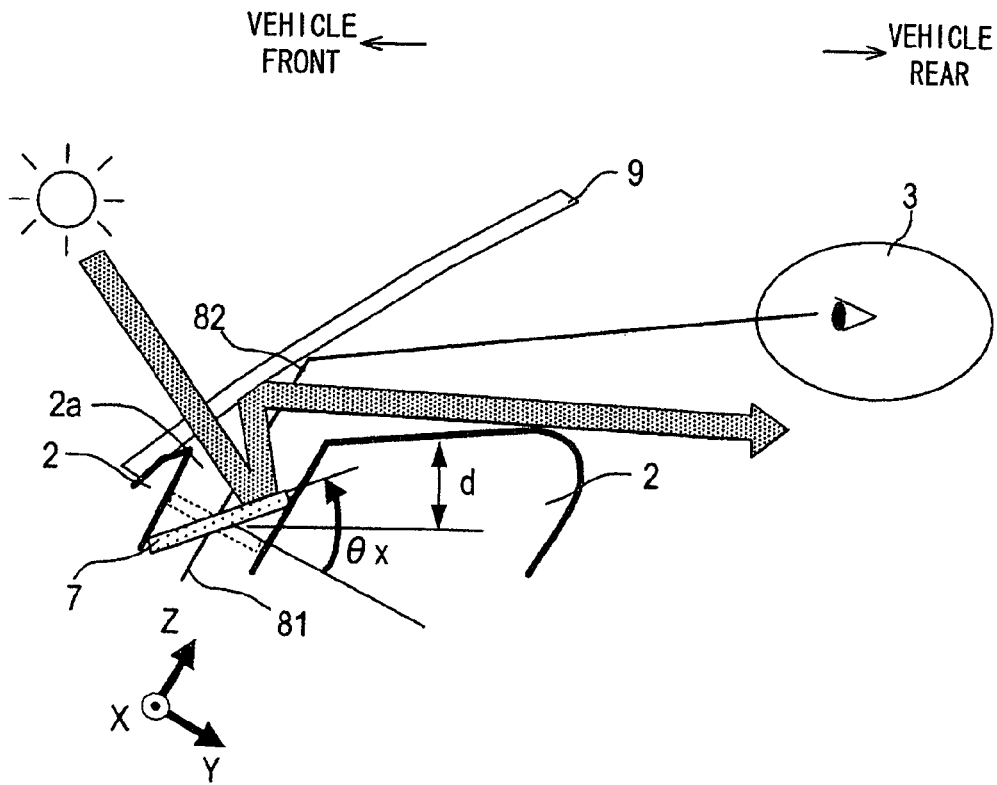
FIG. 6B is another explanatory drawing illustrating how a cylindrical lens is disposed.

The thus formed cylindrical lens 7 is installed as illustrated in FIG. 5 and FIGS. 6A and 6B. More specific description will be given. The cylindrical lens 7 is installed at the installation depth d from the opening in the light guide portion 2a in a so-called off-axis state. In the off-axis state, the following are implemented: the lens formation surface 71 forms the incident side 7a and the flat surface 70 forms the pass-through side 7b; the action axis direction (α-direction) of the cylindrical lens 7 agrees with the horizontal direction (X-direction) in the display image 4; and the direction of the thickness of the cylindrical lens 7 (γ-direction) is inclined from the traveling direction (Z-direction) of the main optical axis of the image light 81 by an inclination angle ex and the β-direction is inclined from the Y-direction by the inclination angle θx.

As illustrated in FIGS. 6A and 6B, the inclination angle θx and the installation depth d are so set that the following is implemented: when the incident angle (angle to the horizontal plane) of light incident on the pass-through side 7b of the cylindrical lens 7 is equal to or larger than an interception upper-limit incident angle θu, light reflected by the pass-through side 7b of the cylindrical lens 7 is prevented from arriving at the eye range 3 (FIG. 6B); and outside light (or outdoor daylight) incident at an incident angle equal to or smaller than the interception upper-limit incident angle θu is blocked by the instrument panel 2 and cannot arrive at the cylindrical lens 7 (FIG. 6A).

The cylindrical lens 7 is disposed with the action axis direction (α-direction) matched with the X-direction so that it has an optical action only in the X-direction. Therefore, the direction of reflection of outside light incident on the pass-through side 7b of the cylindrical lens 7 can be uniquely identified within the Y-Z plane.

The interception upper-limit incident angle θu and thus the installation depth d and the inclination angle θx are appropriately set on a car model-by-car model basis based on the shape of the windshield 9, the formation position and orientation of the light guide portion 2a, and the like.

<Influence of Off-Axis Configuration>

Figure 7A:
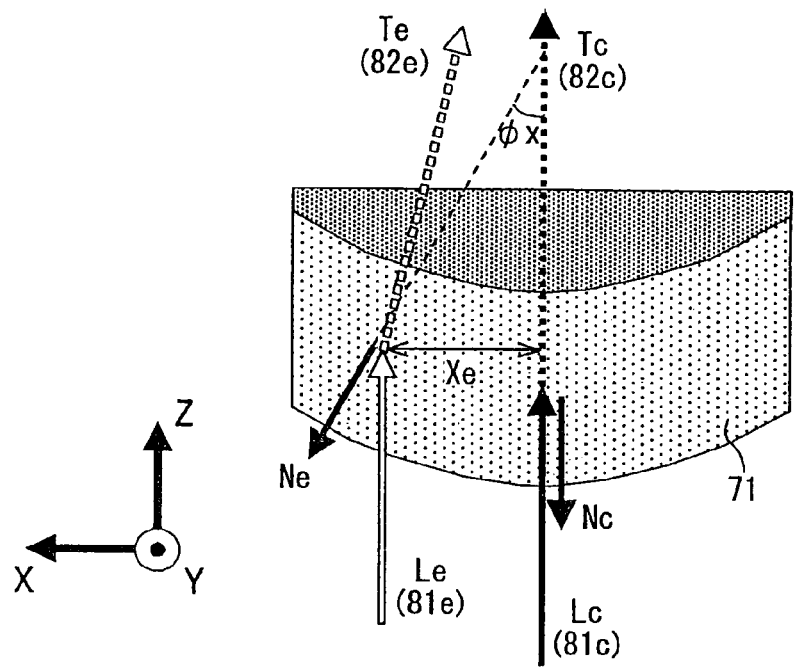
FIG. 7A is a first explanatory drawing illustrating the influence of a cylindrical lens being installed off-axis.
Figure 7B:
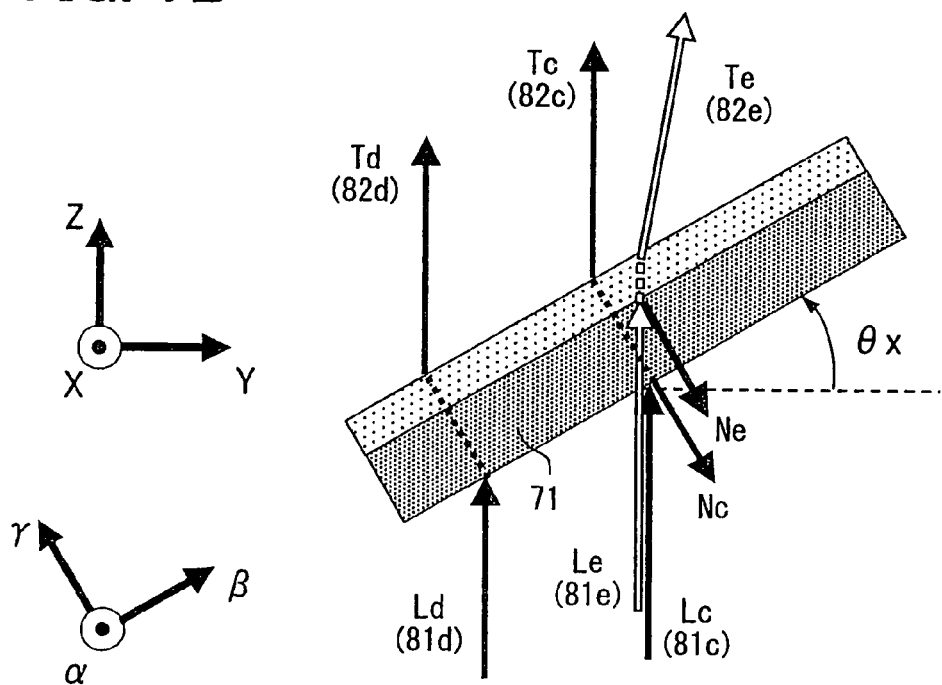
FIG. 7B is another first explanatory drawing illustrating the influence of a cylindrical lens being installed off-axis.

FIGS. 7A and 7B illustrate the influence of the cylindrical lens 7 being installed in an off-axis state. FIG. 7A is a perspective view of the cylindrical lens 7 installed in the light guide portion 2a as viewed from the Y-direction. FIG. 7B is a side view of this cylindrical lens 7 as viewed from the X-direction.

As mentioned above, the cylindrical lens 7 is so disposed that the γ-direction (direction of the thickness of the cylindrical lens 7) is at an angle to the Z-direction (traveling direction of the main optical axis 8). When this is viewed in the X-Z plane as illustrated in FIG. 7A, the following takes place with respect to the image lights 81 incident along the Z-direction: the transmission vector Tc of the image light 81c incident on the center position in the X-direction (=α-direction) is identical with the incidence vector Lc of the image light 81c in direction; and the transmission vector Te of the image light 81e incident on the position distant from the center position by a distance Xe in the X-direction is at an angle to the incidence vector Le of the image light 81e. That is, the cylindrical lens 7 performs an optical action (magnification in this embodiment) on rays of incident light different in incident position in the X-direction.

When this cylindrical lens 7 is viewed in the Y-Z plane as illustrated in FIG. 7B, the following takes place with respect to the image lights 81 incident along the Z-direction: the transmission vectors Tc and Td of the image lights 81c and 81d incident on a position distant only in the Y-direction within the same X-Y plane are oriented to the same direction. That is, the cylindrical lens 7 does not perform an optical action on rays of incident light different in incident position in the Y-direction.

Even when the image lights 81c and 81e are identical in incident position in the Y-direction within the Y-Z plane, however, the following takes place: the transmission vectors Tc and Te of the image lights 81c and 81e different in incident position in the X-direction are oriented to different directions. In addition, the deviation in direction is more increased as they go away from the center position in the X-direction relative to the orientation (i.e., Z-direction) of the transmission vectors Tc and Td of the image lights 81c and 81d incident on the center position in the X-direction.

The reason for this is as follows: when the incident position differs in the X-direction, the three-dimensional orientation of a normal vector in this incident position differs; and the influence of this appears in the direction of a transmission vector in the Y-Z plane.

More specific description will be given. It will be assumed that: the normal vector of the image light 81c in the incident position at the incident-side end face 71 of the cylindrical lens 7 is Nc; the normal vector of the image light 81e in the incident position is Ne; and the angle formed between these normal vectors Nc and Ne in the X-Z plane is ϕx. Thus, the vector components of the normal vectors Nc and Ne can be respectively expressed by (2). Since the incidence vector Lc and the incidence vector Le are equal, however, the incidence vectors Lc and Le are expressed by the same unit vector here.

[Expression 2]

$$Lc = Le = \begin{pmatrix} 0 \\ 0 \\ 1 \end{pmatrix}, Nc = \begin{pmatrix} 0 \\ \sin\theta x \\ -\cos\theta x \end{pmatrix}, Ne = \begin{pmatrix} \sin\phi x \\ \cos\phi x \sin\theta x \\ -\cos\phi x \cos\theta x \end{pmatrix} \quad (2)$$

Further, the transmission vector T of the image light 82 that passed through the cylindrical lens 7 has the relation expressed by Expression (3), where L is the incidence vector of the image light 81 incident on the cylindrical lens 7; N is the normal vector of the image light 81 in the incident position at the incident-side end face 71; and η is the refractive index of the cylindrical lens 7.

[Expression 3]

$$T = -\left[1 - \frac{1}{\eta^2}\{1 - (L \cdot N)^2\}^{\frac{1}{2}}\right]N - \frac{1}{\eta}\{L - (L \cdot N)N\} \quad (3)$$

Therefore, the transmission vectors Tc and Te can be respectively determined by substituting the vector components of the incidence vectors Lc and Le and the normal vectors Nc and Ne in Expression (2) into Expression (3).

More specific description will be given. As is apparent from Expressions (2) and (3), the transmission vector Te is affected as described below. The transmission vector Te indicates the direction of the image light 82e obtained when the image light 81e incident on a position distant in the X-direction from the center position in the X-direction passes through a lens. The transmission vector Te is influenced by the angle ϕx with respect to its vector components in the Y-direction and the Z-direction.

For this reason, a deviation in the Y-Z plane (i.e., deviation in output angle) is produced between the following: the transmission vector Tc, which indicates the traveling direction of the image light 82c obtained when the image light 81c incident on the center position in the X-direction (=α-direction) passes through a lens, and this transmission vector Te.

Figure 8A:
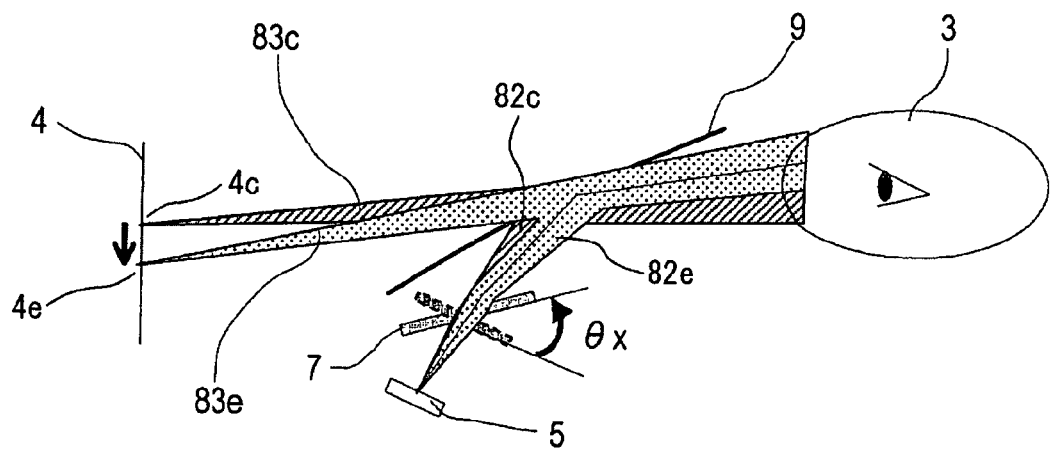
FIG. 8A is a second explanatory drawing illustrating the influence of a cylindrical lens being installed off-axis.

As illustrated in FIG. 8A, this deviation shifts the positions of the following in the vertical direction (downward in this drawing): the position of the display image 4c based on the image light 83c obtained when the image light 82c is reflected by the windshield 9; and the position of the display image 4e based on the image light 83e obtained when the image light 82e is reflected by the windshield 9. This deviation is more increased as it goes closer to either end in the horizontal direction (as it goes away from the center position in the X-direction).

Figure 8B:
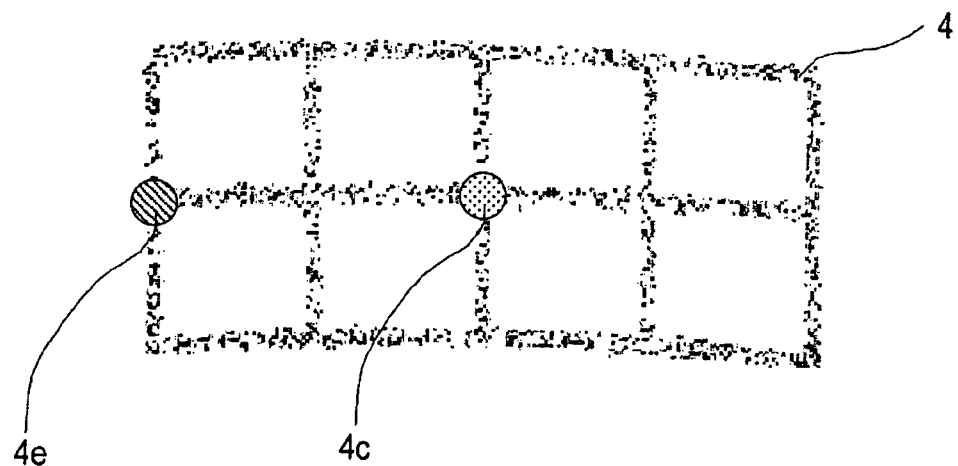
FIG. 8B is another second explanatory drawing illustrating the influence of a cylindrical lens being installed off-axis.

Therefore, the cylindrical lens 7 disposed in an off-axis state produces a fan-shaped distortion, illustrated in FIG. 8B, in the display image 4 visually perceived by an occupant of the vehicle. FIG. 8A or 8B does not illustrate an action actually obtained with the HUD apparatus 1. They illustrate an action obtained when an image light is directly projected from the display device 5 to the cylindrical lens 7 without the intervention of the free-form mirror 6.

<Configuration and Action of Free-Form Mirror>

Figure 9:
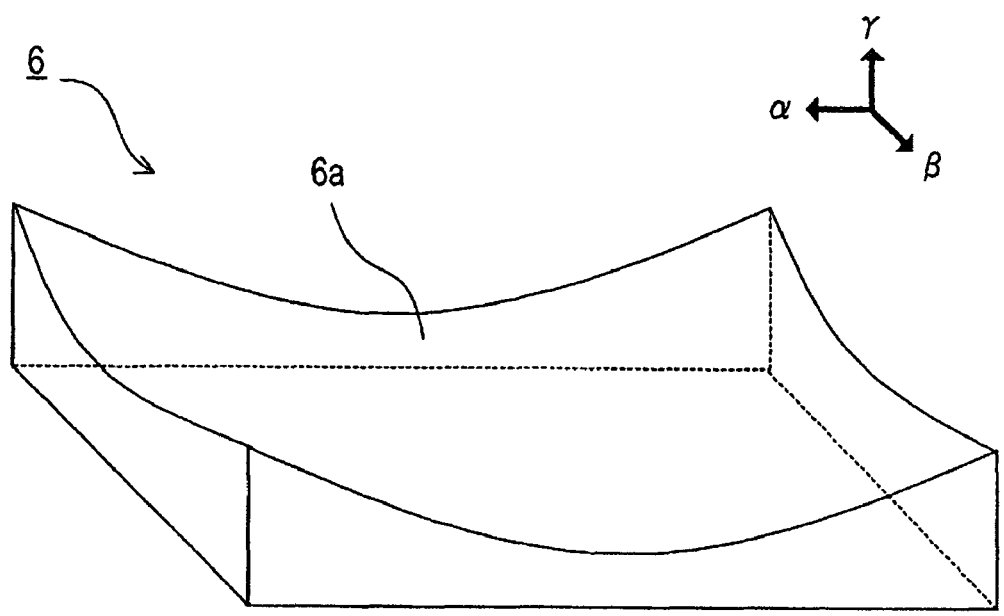
FIG. 9 is a perspective view of a free-form mirror.
Figure 11:
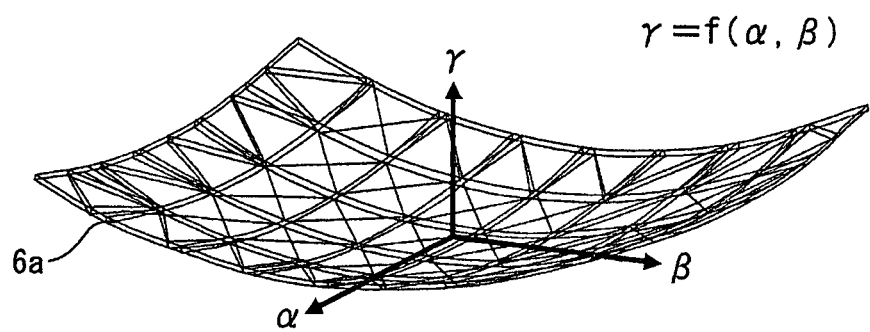
FIG. 11 is an explanatory drawing representing a reflection plane of a free-form mirror.

As illustrated in FIG. 9, the free-form mirror 6 is a publicly known one. That is, it has a reflection surface 6a reflecting light. It will be assumed that the direction of the optical axis of the free-form mirror 6 is γ-direction; the two directions orthogonal thereto are α-direction and β-direction; the coordinate in the γ-direction is γ; and the coordinates in the α-β plane are (α, β). At this time, the shape of the reflection surface 6a is constructed of a curved surface expressed by a polynomial expression γ=f(α, β). (Refer to FIG. 11.)

The curvature of the curved surface of the reflection surface 6a is so set that such an optical action as to implement the following can be obtained: incident light is expanded in the α-direction and the β-direction and a distortion in the display image 4 produced based on the shape of the windshield 9 is corrected.

Figure 10A:
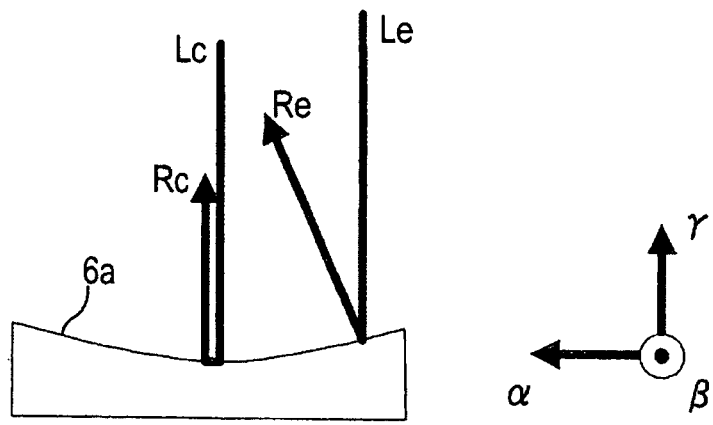
FIG. 10A is an explanatory drawing illustrating a sectional shape of a free-form mirror and the traveling of light incident on the free-form mirror.
Figure 10B:
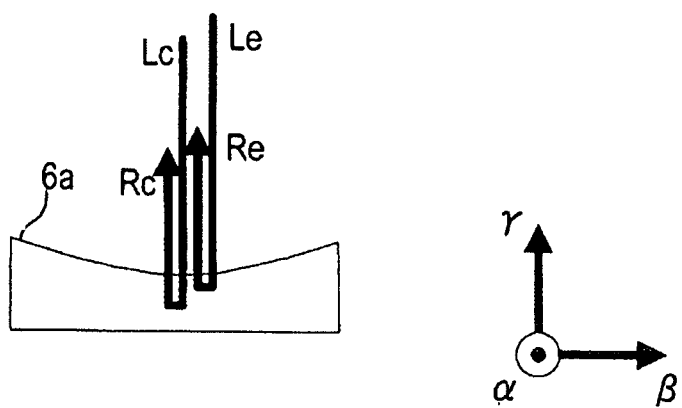
FIG. 10B is another explanatory drawing illustrating a sectional shape of a free-form mirror and the traveling of light incident on the free-form mirror.

FIG. 10A illustrates the sectional shape of the free-form mirror 6 in the α-γ plane and the traveling direction of light reflected by the reflection surface 6a as viewed from the β-direction. FIG. 10B illustrates the sectional shape of the free-form mirror 6 in the β-γ plane and the traveling direction of light reflected by the reflection surface 6a as viewed from the α-direction.

Hereafter, the following vectors will be designated as follows: a vector that represents the traveling direction of incident light in the center position on the reflection surface 6a of the free-form mirror in the α-direction and the β-direction is incidence vector Lc; a vector that represents the traveling direction of reflected light based on this incident light is reflection vector Rc; a vector that represents the traveling direction of incident light in a position distant in the α-direction within the α-β plane from the center position in the α-direction and the β-direction is incidence vector Le; and a vector that represents the traveling direction of reflected light based on this incident light is reflection vector Re.

The free-form mirror 6 performs an optical action on incident light along the γ-direction both in the α-direction and in the β-direction. (The reflection vectors Rc and Re are different in direction both in the α-γ plane and in the β-γ plane.) As illustrated in the drawings, however, the following takes place with respect to the reflected light (reflection vectors Rc and Re) obtained when incident light in the center position in the β-direction within the α-β plane is reflected by the reflection surface 6a: when viewed in the β-γ plane, they are oriented to the same direction.

<Disposition of Free-Form Mirror>

Figure 12:
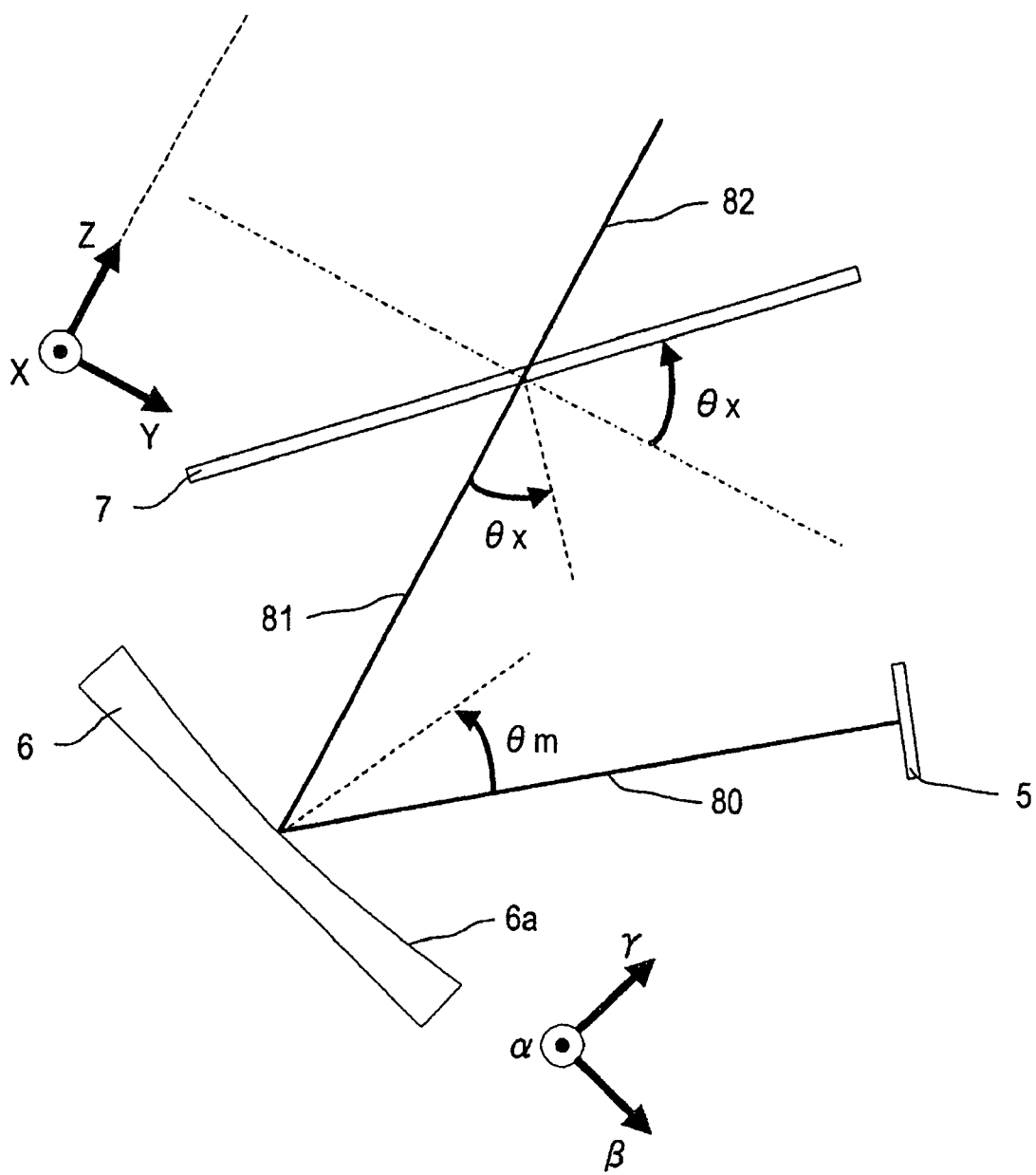
FIG. 12 is an explanatory drawing illustrating how a free-form mirror is inclined and disposed.

The thus formed free-form mirror 6 is installed as illustrated in FIG. 12. More specific description will be given. The formed free-form mirror is installed in a so-called off-axis in which the α-direction agrees with the X-direction (horizontal direction in the display image 4) and the Z-direction is inclined from the γ-direction by an inclination angle θm. (The Y-direction is similarly inclined from the β-direction.) At the same time, the formed free-form mirror 6 is disposed in such a position that light reflected at the center of the free-form mirror 6 passes through the center of the cylindrical lens 7.

<Influence of Off-Axis Configuration>

Figure 13A:
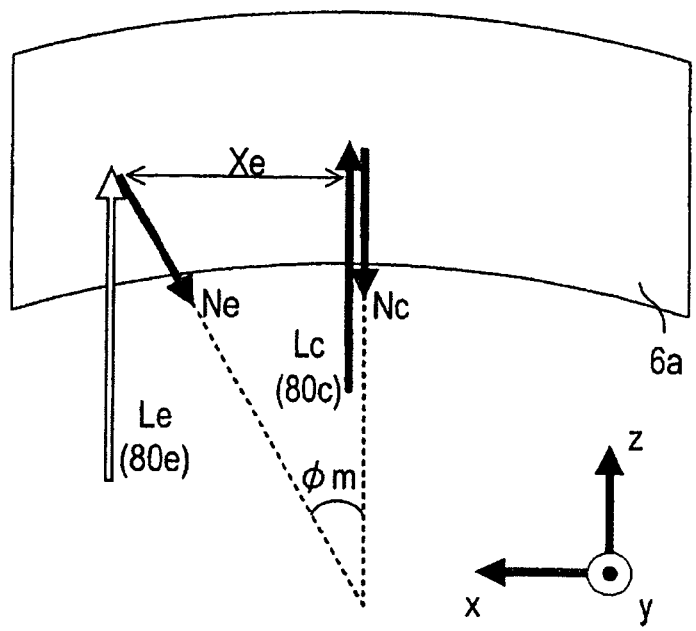
FIG. 13A is a first explanatory drawing illustrating the influence of a free-form mirror being installed off-axis.
Figure 13B:
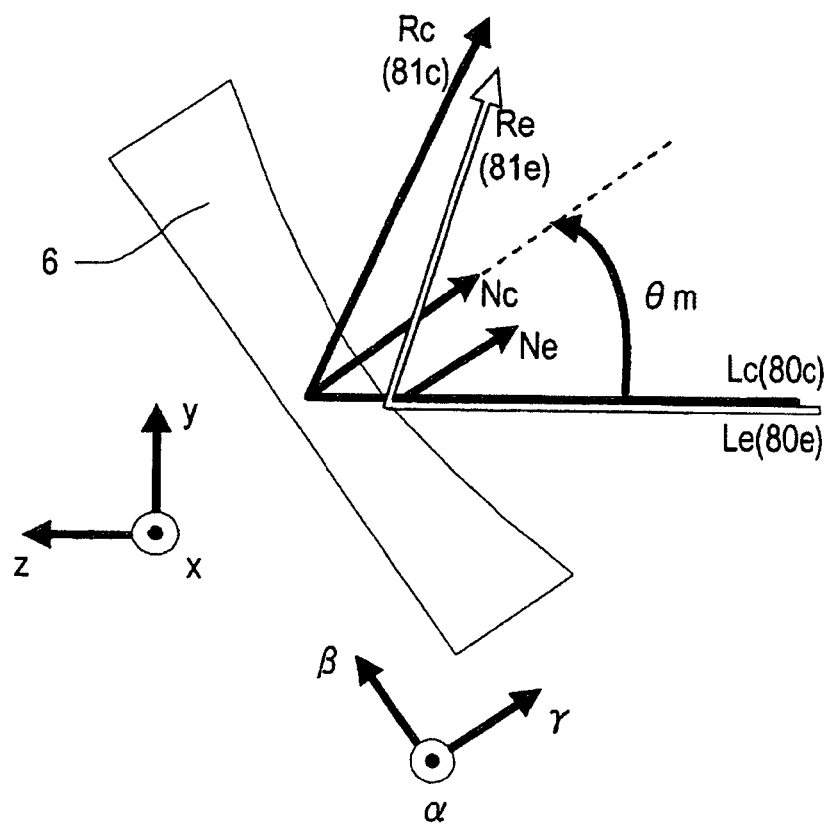
FIG. 13B is another first explanatory drawing illustrating the influence of a free-form mirror being installed off-axis.

FIGS. 13A and 13B illustrate the influence of the free-form mirror 6 being installed in an off-axis state. Hereafter, as illustrated in the drawings, the traveling direction of the main optical axis 8 of an image projected from the display device 5 will be designated as z-direction; the horizontal direction in this image will be designated as x-direction; and the direction orthogonal both to the z-direction and to the x-direction will be designated as y-direction.

FIG. 13A is a perspective view of the free-form mirror 6 installed in the HUD apparatus 1 as viewed from the y-axis direction. FIG. 13B is a side view of this free-form mirror 6 as viewed from the x-axis direction (=X-axis direction).

As mentioned above, the free-form mirror 6 is so disposed that the γ-direction is inclined from the Z-direction (the γ-direction is also inclined from the z-direction). When this free-form mirror 6 is viewed in the x-z plane, as illustrated in FIG. 13A, the following takes place with respect to the image lights 80 incident along the z-direction: the image lights 80c and 80e incident on a position distant only in the x-direction within the same x-y plane are different in the normal vectors Nc and Ne in the incident position.

For this reason, the following takes place when they are viewed in the y-z plane, as illustrated in FIG. 13B: the reflection vectors Re and Rc of the image lights 80c and 80e are influenced by the difference between the normal vectors Nc and Ne and oriented to different directions.

More specific description will be given. Letting the angle formed between the normal vectors Nc and Ne in the x-z plane be ϕm, the vector components of the normal vectors Nc and Ne can be expressed by Expression (4). Since the incidence vector Lc and the incidence vector Le are equal, however, the incidence vectors Lc and Le are expressed by the same unit vector here.

[Expression 4]

$$Lc = Le = \begin{pmatrix} 0 \\ 0 \\ 1 \end{pmatrix}, Nc = \begin{pmatrix} 0 \\ \sin\theta m \\ -\cos\theta m \end{pmatrix}, Ne = \begin{pmatrix} \sin\phi m \\ \cos\phi m \sin\theta m \\ -\cos\phi m \cos\theta m \end{pmatrix} \quad (4)$$

Further, the reflection vector R that represents the traveling direction of the image light 81 reflected by the free-form mirror 6 has the relation expressed by Expression (5), where L is the incidence vector indicating the traveling direction of the image light 80 incident on the free-form mirror 6; and N is the normal vector indicating the normal direction of the image light 80 in the incident position at the reflection surface 6a.

[Expression 5]

$$R = 2(N \times L) \times N - L \quad (5)$$

Therefore, the reflection vectors Rc and Re can be respectively determined by substituting the vector components of the incidence vectors Lc and Le and the normal vectors Nc and Ne in Expression (4) into Expression (5).

More specific description will be given. As is apparent from Expression (5), the reflection vector Re is affected as described below. The reflection vector Re indicates the traveling direction of the image light 81e obtained when the image light 80e incident on a position distant from the center position in the x-direction is reflected. The reflection vector Re is influenced by the angle ϕm with respect to its vector components in the γ-direction and the z-direction.

For this reason, a deviation in the y-z plane (i.e., deviation in reflection angle) is produced between the following: the reflection vector Rc, which indicates the traveling direction of the image light 81c obtained when the image light 80c incident on the center position in the x-direction is reflected, and this reflection vector Re.

Figure 14A:
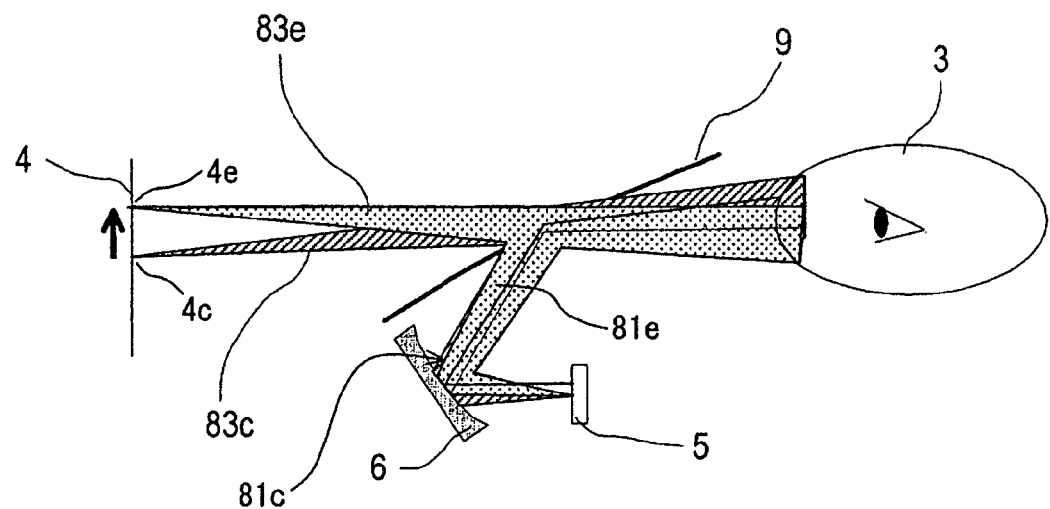
FIG. 14A is a second explanatory drawing illustrating the influence of a free-form mirror being installed off-axis.

As illustrated in FIG. 14A, this deviation shifts the positions of the following in the vertical direction (upward in this drawing): the position of the display image 4c based on the image light 83c obtained when the image light 81c is reflected by the windshield 9; and the position of the display image 4e based on the image light 83e obtained when the image light 81e is reflected by the windshield 9. This deviation is more increased as it goes close to either end in the horizontal direction (as it goes away from the center position in the x-direction).

Figure 14B:
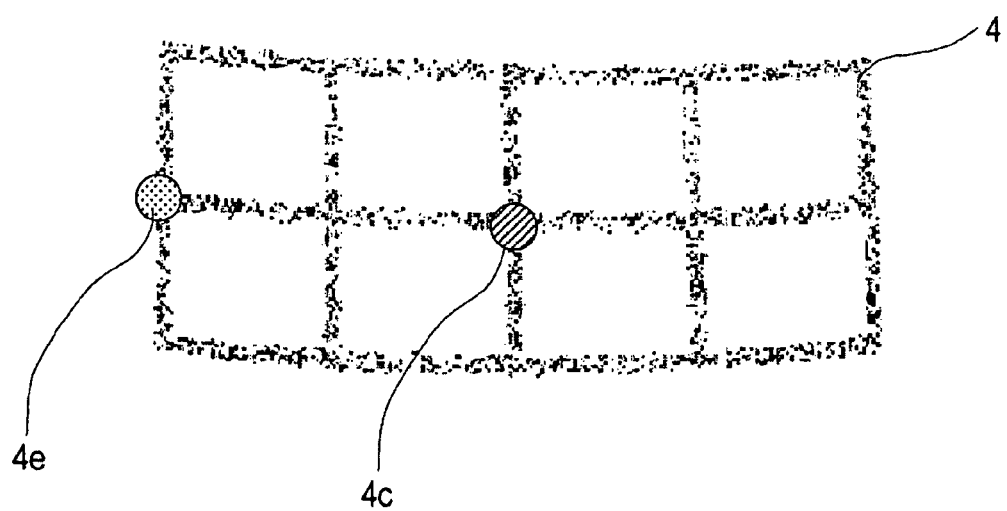
FIG. 14B is another second explanatory drawing illustrating the influence of a free-form mirror being installed off-axis.

Therefore, the free-form mirror 6 disposed in an off-axis state produces a reversed fan-shaped distortion, illustrated in FIG. 14B, in the display image 4 visually perceived by an occupant of the vehicle. FIG. 14A or 14B does not illustrate an action actually obtained with the HUD apparatus 1. They illustrate an action obtained when an image light projected from the display device 5 is reflected by the free-form mirror 6 and is directly projected to the windshield 9 without the intervention of the cylindrical lens 7.

More specific description will be given. It will be assumed that: the positional deviation in the Y-direction caused in the Y-Z plane when image lights different in incident position in the X-direction are reflected by the free-form mirror 6 is ΔM; and the positional deviation in the Y-direction caused in the Y-Z plane when they passes through the cylindrical lens 7 is ΔL. In this case, the inclination angle θm of the free-form mirror 6 is so set that ΔM and ΔL are identical with each other in magnitude and the directions of the deviations in the Y-direction are opposite to each other. Thus, the distortion in the display image 4 produced by the free-form mirror 6 and the distortion in the display image 4 produced by the cylindrical lens 7 are canceled out by each other.

In the above embodiment, the windshield 9 may function as a reflecting means or element; the cylindrical lens 7 may function as an optical means or element; the display device 5 may function as an image projecting means or element; the instrument panel 2 may function as a shielding means or element; and the free-form mirror 6 may function as a deflecting means or element.

<Effect of First Embodiment>

As described up to this point, the following measures are taken with respect to the HUD apparatus 1. The inclination angle θx and the installation depth d of the cylindrical lens 7 is so set that the following is implemented: when the incident angle of light incident on its pass-through side 7b is equal to or greater than the interception upper-limit incident angle θu, the light reflected by the pass-through side 7b does not arrive at the eye range 3. The cylindrical lens 7 is installed inside the light guide portion 2a so that the following is implemented: outside light incident at an incident angle lequal to or less than the interception upper-limit incident angle θu is blocked by the instrument panel 2 and cannot arrive at the cylindrical lens 7.

According to the HUD apparatus 1, therefore, outside light reflected by the cylindrical lens 7 does not enter an occupant's eye range 3 and thus the display image 4 excellent in visibility can be obtained. In the HUD apparatus 1, the various elements or means are so disposed that the followings are canceled out by each other: the distortion (fan-shaped distortion) in the display image 4 due to the inclined disposition of the cylindrical lens 7; and the distortion (reversed fan-shaped distortion) in the display image 4 due to the inclined disposition of the free-form mirror 6. That is, distortions can be canceled out by balancing with each other (i) the magnification and the inclination angle of the cylindrical lens 7 and (ii) the magnification and the inclination angle of the free-form mirror 6. This makes it possible for an occupant to visually perceive the display image 4 free from a distortion through a simple construction.

<Modification of First Embodiment>

Figure 15:
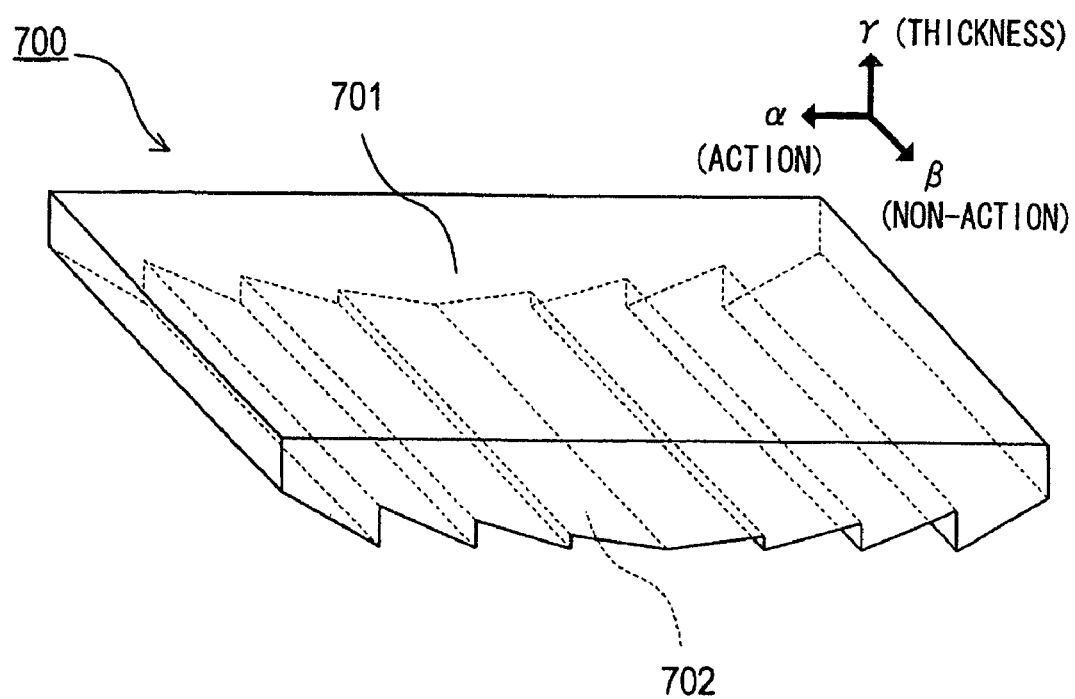
FIG. 15 is a perspective view of a linear Fresnel lens.

Some examples will be taken. The first embodiment uses the cylindrical lens 7 as the optical means or element. Instead of this cylindrical lens 7, a linear Fresnel lens 700 having an optical action only in one direction, illustrated in FIG. 15, may be used.

Figure 16A:
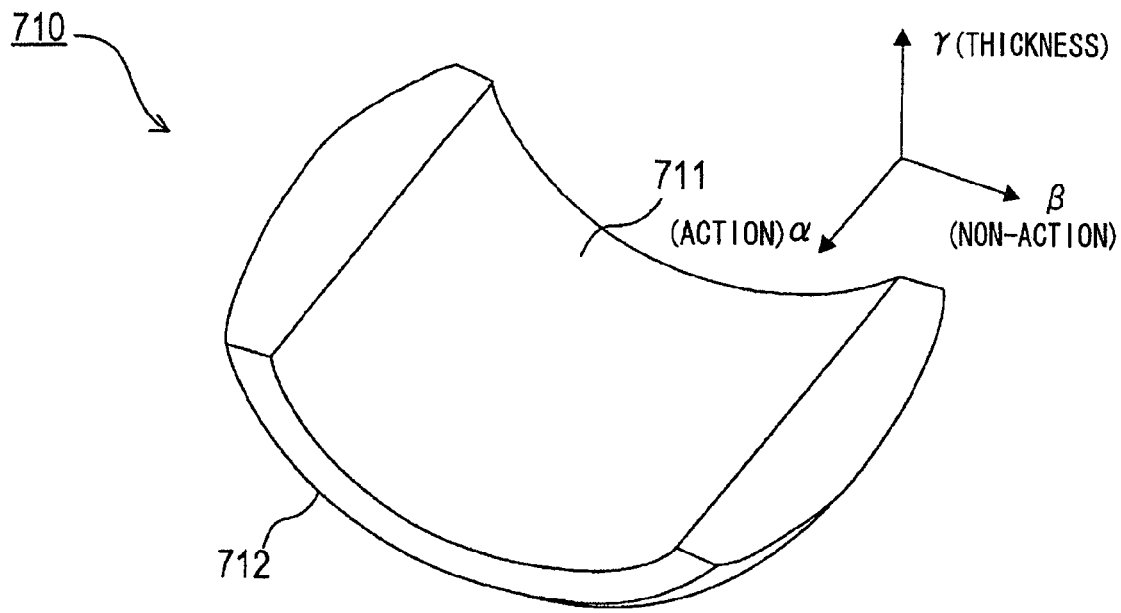
FIG. 16A is a perspective view of a curved substrate-like cylindrical lens.
Figure 16B:
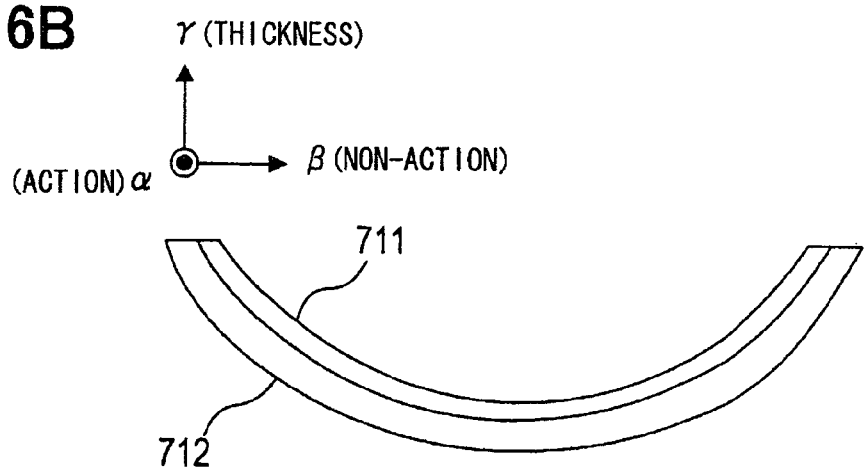
FIG. 16B is another perspective view of a curved substrate-like cylindrical lens.
Figure 16C:
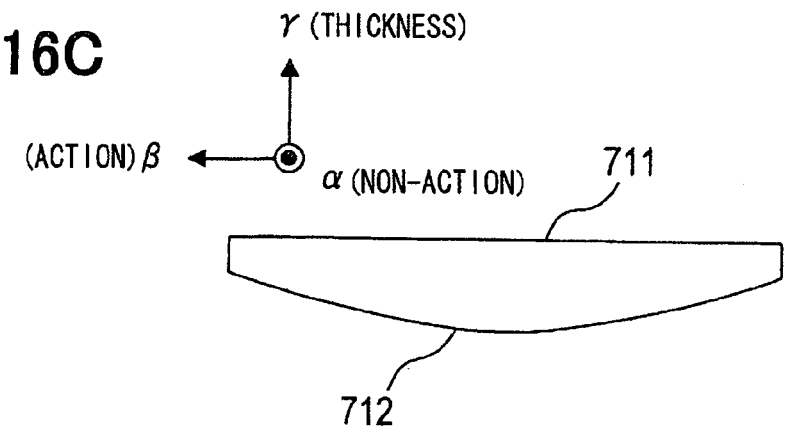
FIG. 16C is a further perspective view of a curved substrate-like cylindrical lens.
Figure 17A:
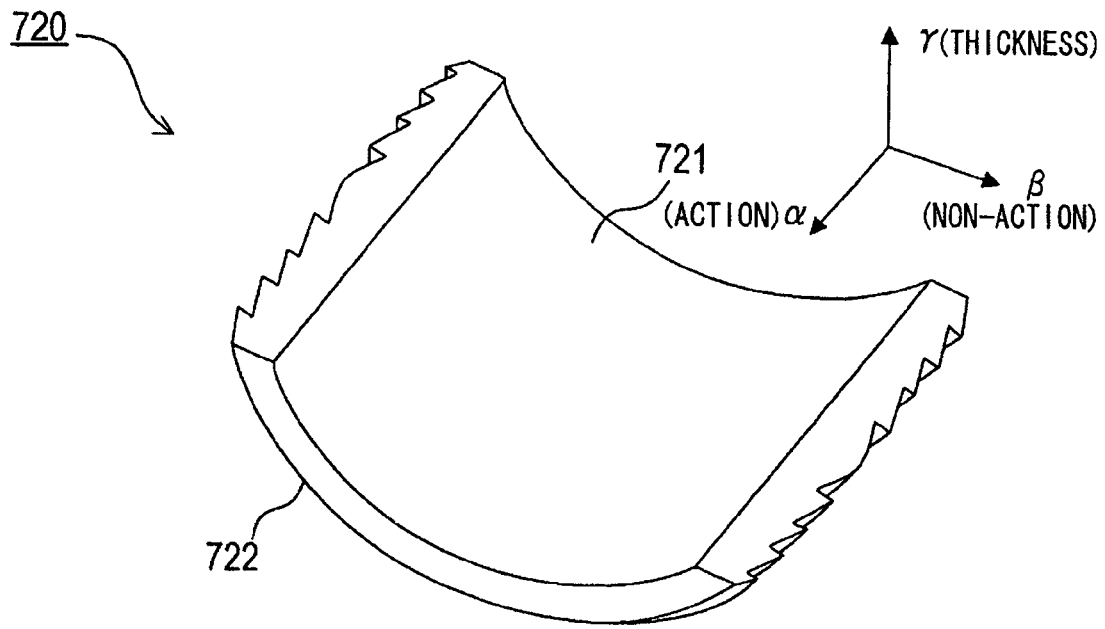
FIG. 17A is a perspective view of a curved substrate-like linear Fresnel lens.
Figure 17B:
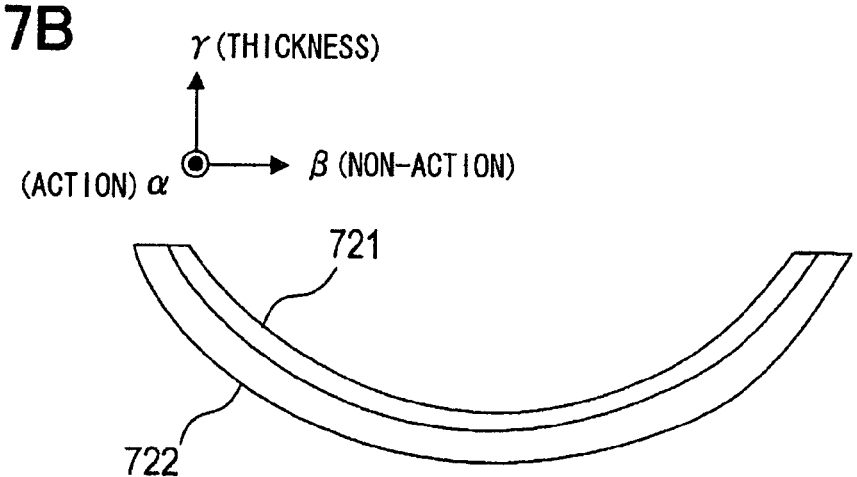
FIG. 17B is another perspective view of a curved substrate-like linear Fresnel lens.
Figure 17C:
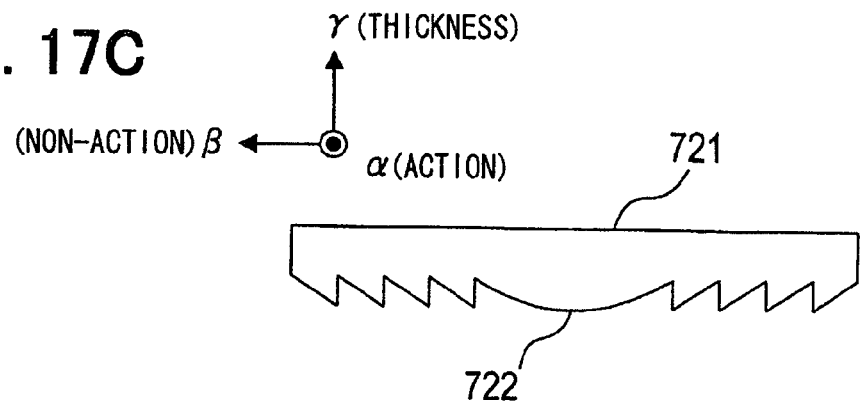
FIG. 17C is a further perspective view of a curved substrate-like linear Fresnel lens.

As is apparent from the drawing, the linear Fresnel lens 700 is smaller in thickness than the cylindrical lens 7. This contributes to downsizing of the HUD apparatus 1. Further, instead of the cylindrical lens 7, such a curved substrate-like cylindrical lens 710 as illustrated in FIGS. 16A to 16C may be used. The curved substrate-like cylindrical lens has a curvature for expanding incident light in the α-direction. In addition, the substrate itself is a concave 711 having a cylindrical inside face shape, and the other surface is a convex 712 extended along the concave 711. Further, such a curved substrate-like linear Fresnel lens as illustrated in FIGS. 17A to 17C may be used.

Figure 18A:
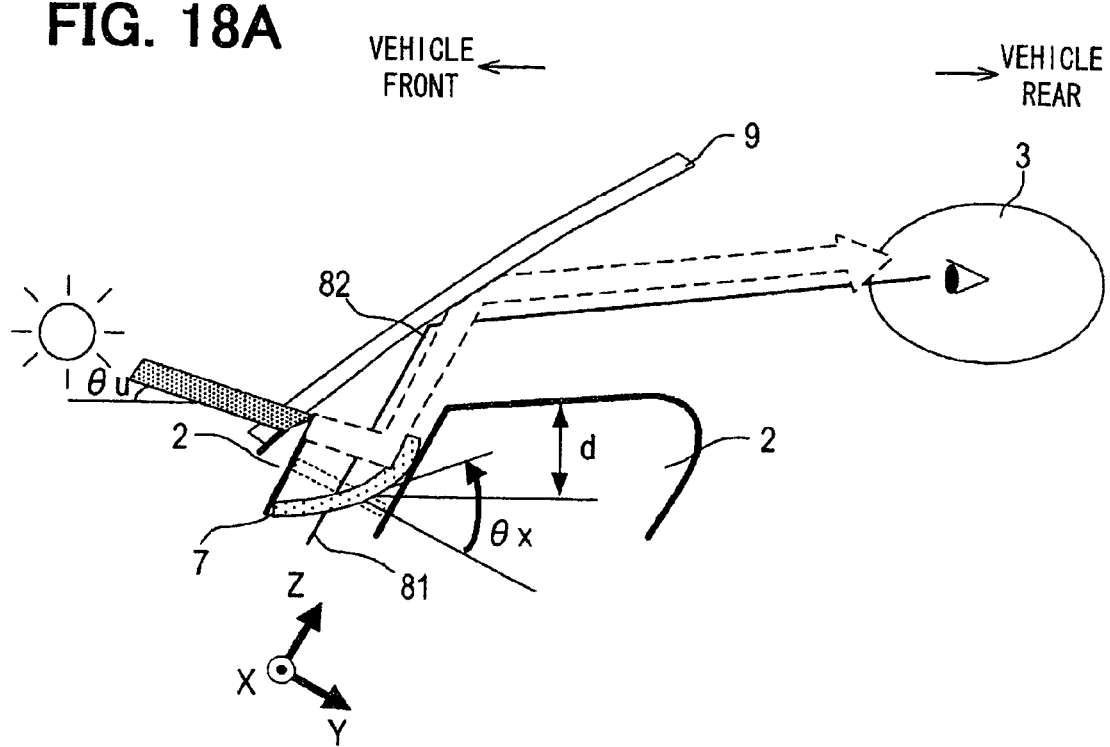
FIG. 18A is an explanatory drawing illustrating how a curved substrate-like cylindrical lens (or a curved substrate-like linear Fresnel lens) is disposed.
Figure 18B:
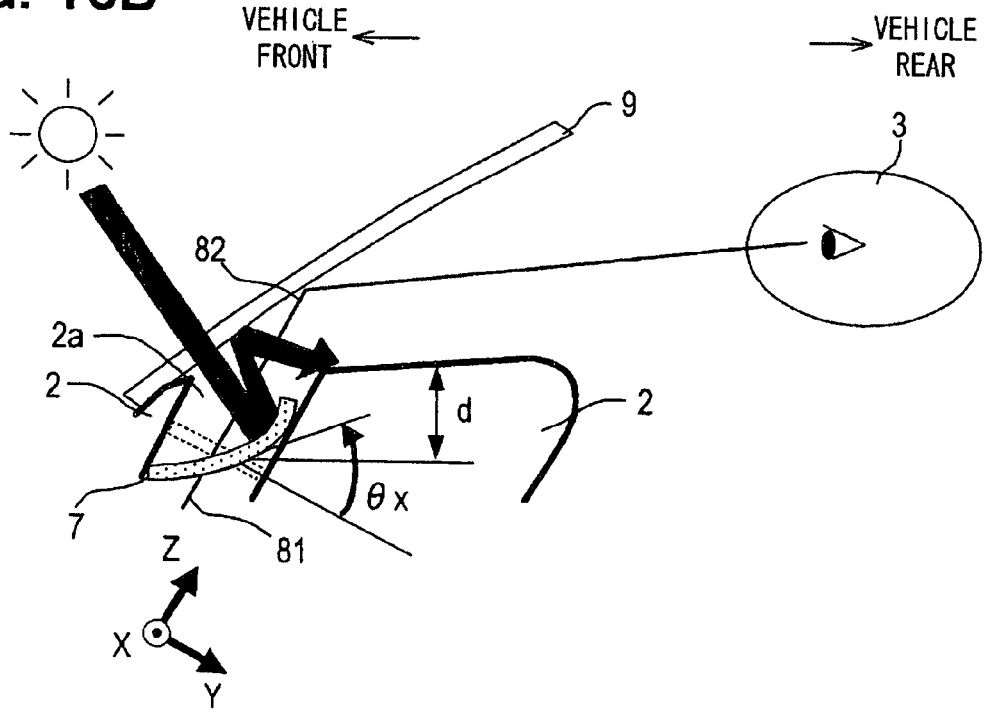
FIG. 18B is another explanatory drawing illustrating how a curved substrate-like cylindrical lens (or a curved substrate-like linear Fresnel lens) is disposed.

When a cylindrical curved substrate is used as the lens substrate, the following advantage is brought: the light shielding upper-limit incident angle θu is reduced as illustrated in FIG. 18A; and further, it is made easier to deflect outside light incident at an angle equal to or larger than the light shielding upper-limit incident angle θu to outside the eye range, as illustrated in FIG. 18B. That is, the light shielding portion of the instrument panel 2 can be reduced in height. In other words, it is possible to make the depth of the installation position (i.e., installation depth d) shallow, and this enhances ease of installation inside the instrument panel.

Further, an achromatizing lens, an achromatic lens, an apochromatic lens, or the like constructed by combining multiple lens formed of materials, different in refractive index and chromatic dispersion, so that chromatic aberration is corrected may be used.

In this case, a display image 4, very small in chromatic aberration, can be obtained, and this makes it possible to further enhance the visibility of the display image 4. Instead of the cylindrical lens 7, a free-form lens having an optical action not only in the α-direction but also in the β-direction may be used. However, the optical action in the β-direction must be so minute that it can be controlled to prevent the entry of outside light reflected by the pass-through side 7b into the eye range 3 by appropriately setting the inclination angle θx and the installation depth d.

Figure 19:
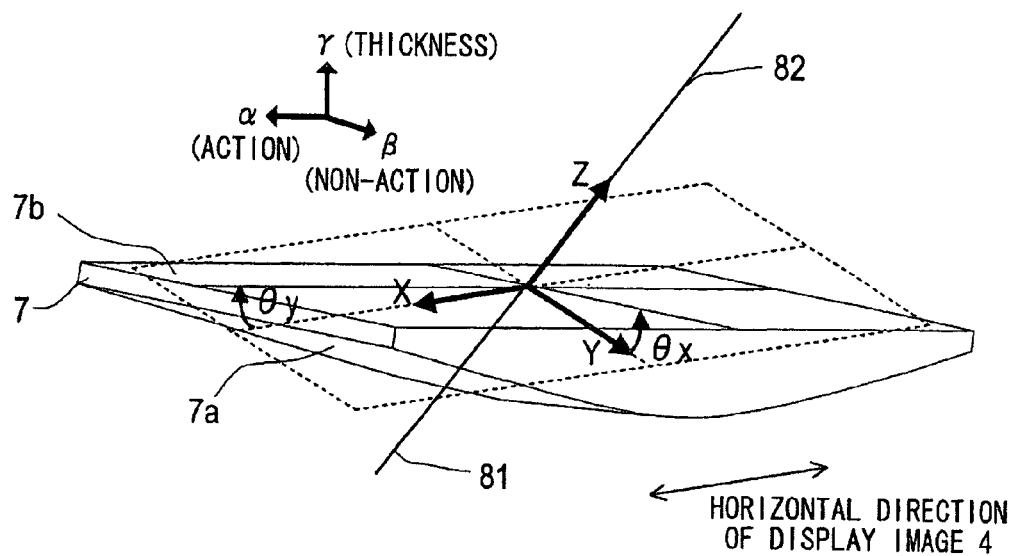
FIG. 19 is a second explanatory drawing illustrating how a cylindrical lens is inclined.

In this case, the HUD apparatus 1 may be so constructed that, for example, the distortion arising from the shape of the windshield 9 is corrected by this free-form lens, not by the free-form mirror 6. In the first embodiment, the cylindrical lens 7 is disposed with the α-direction matched with the X-direction. Instead, as illustrated in FIG. 19, it may be disposed with the α-direction inclined from the X-direction by an inclination angle θy. In this case, however, the influence of an optical action in the α-direction also appears in the Y-Z plane. To cope with this, the inclination angle θy must be set within such a range that even under the influence of this optical action, outside light reflected by the pass-through side 7b does not enter the eye range 3.

Figure 20:
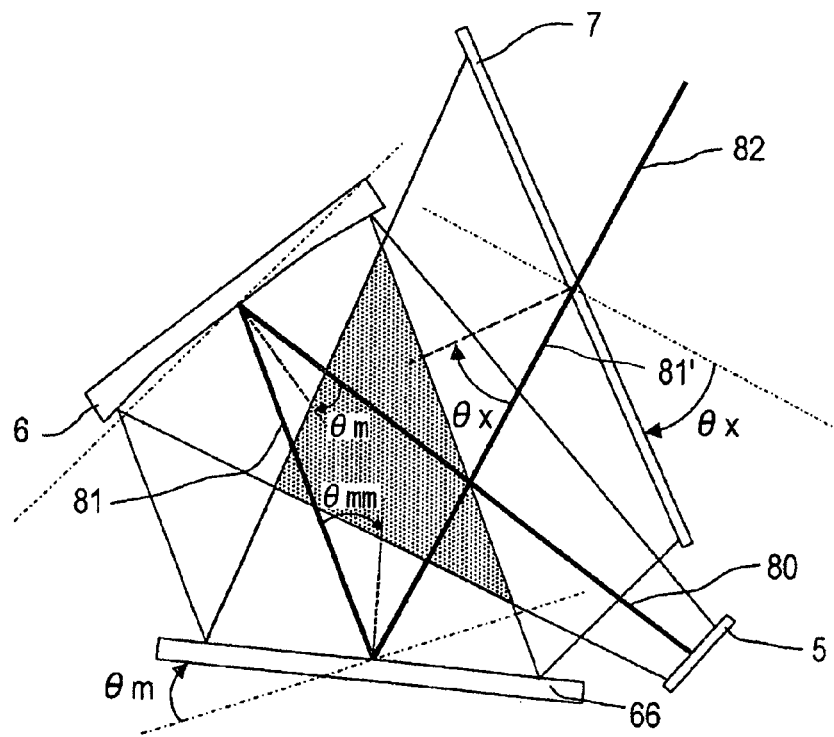
FIG. 20 is an explanatory drawing how multiple free-form mirrors are disposed.
Figure 21:
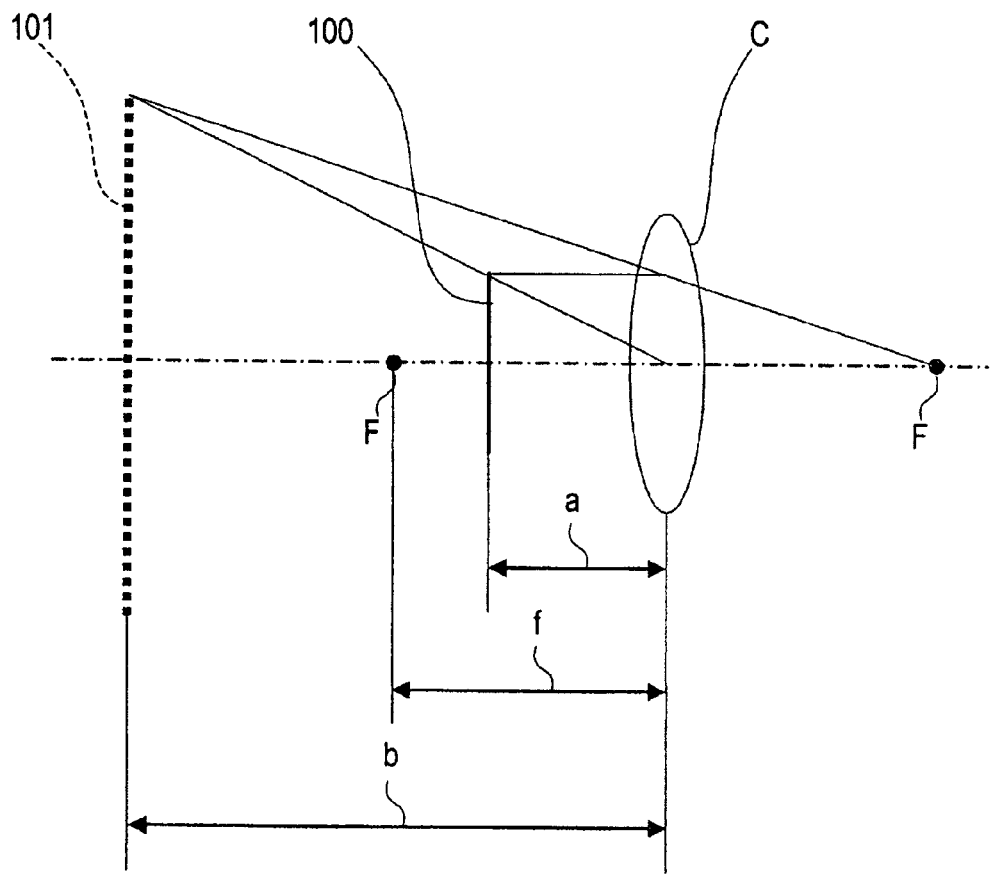
FIG. 21 is an explanatory drawing illustrating a principle on which an optical path can be equivalently lengthened by a convex lens as a common magnifying lens.
Figure 22:
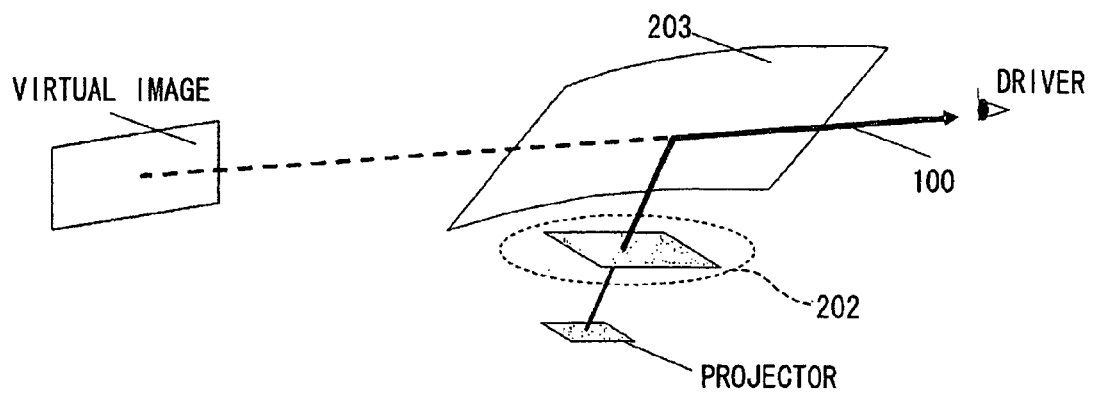
FIG. 22 is an explanatory drawing illustrating how a virtual image appears in a position beyond a windshield.
Figure 23:
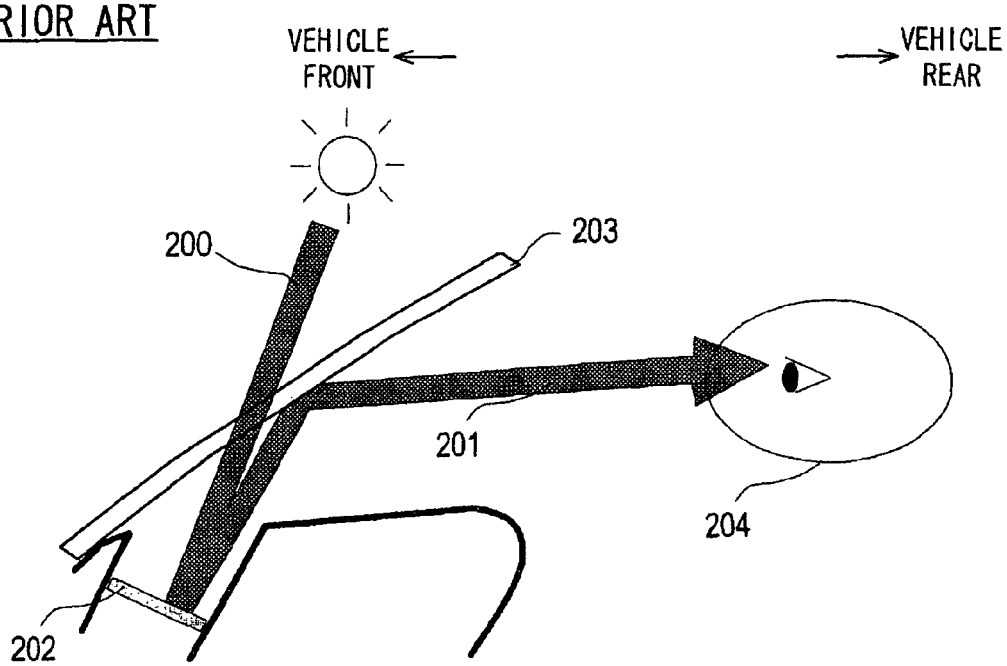
FIG. 23 is an explanatory drawing illustrating how sunlight reflected by a lens enters an occupant's eye range.
Figure 24:
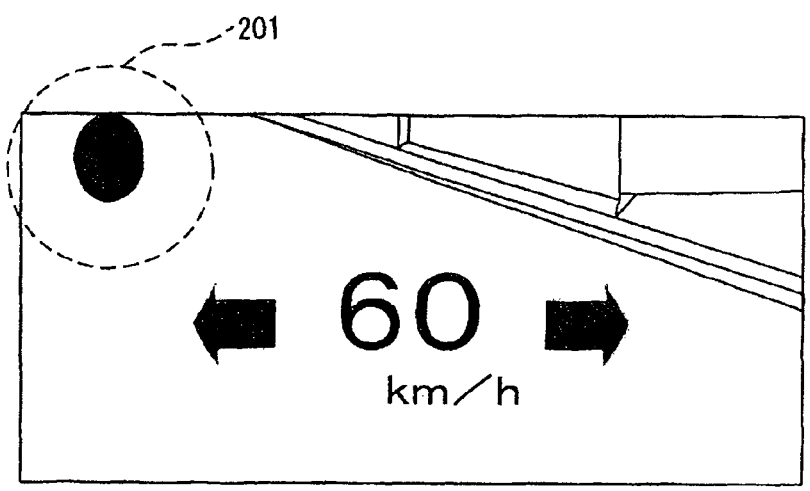
FIG. 24 is an illustration showing how noise arising from sunlight appears in a display image.

In this case, the correction of a distortion in the display image 4 in the horizontal direction can be finely adjusted, and the visibility of the display image 4 can be enhanced. In the above embodiment, only one free-form mirror 6 is used as the deflecting means or element. As illustrated in FIG. 20, a reflecting mirror 66 may be added. This reflecting mirror 66 further reflects the image light 81 reflected by the free-form mirror 6 and guides it to the cylindrical lens 7.

In this case, one and the same space is also used as the path of image lights. Even in the limited space in the instrument panel 2, therefore, the path of image lights can be lengthened, and this contributes to further downsizing of the HUD apparatus 1.

The number of the reflecting mirrors 66 need not be one, and two or more reflecting mirrors may be added. The reflecting mirror 66 may have an optical action, such as magnification. In the first embodiment, the free-form mirror 6 is installed in such an orientation that the cylindrical lens 7 and the display device 5 are disposed in the same Y-Z plane (they are identical in position in the X-direction). According to the shape of the space in the instrument panel 2, instead, the free-form mirror 6 may be installed in such an orientation that they are disposed in different Y-Z planes (they are different in position in the X-direction).

That is, the degree of freedom in disposing the components configuring the apparatus can be enhanced by appropriately setting the orientation of the free-form mirror 6. In the first embodiment, a distortion arising from the off-axis disposition of the cylindrical lens 7 is corrected by inclining the free-form mirror 6 so as to produce a distortion canceling out this distortion. The HUD apparatus 1 may be so constructed that the distortion is corrected by the shape of the curved surface of a free-form lens disposed in place of the free-form mirror 6 or the cylindrical lens 7.

Second Embodiment

Figure 25A:
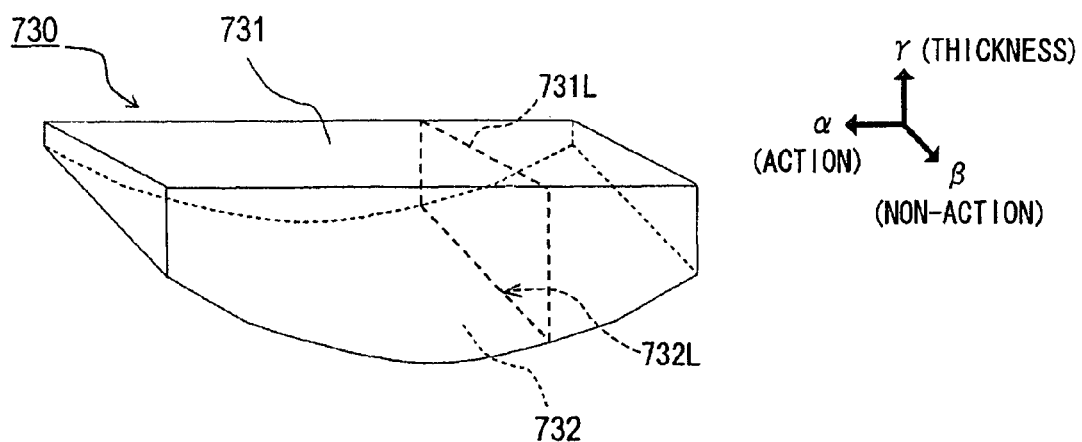
FIGS. 25A, 25B are a perspective view and a cross-sectional view of a wedge-shaped cylindrical lens according to a second embodiment of the present invention.
Figure 25B:
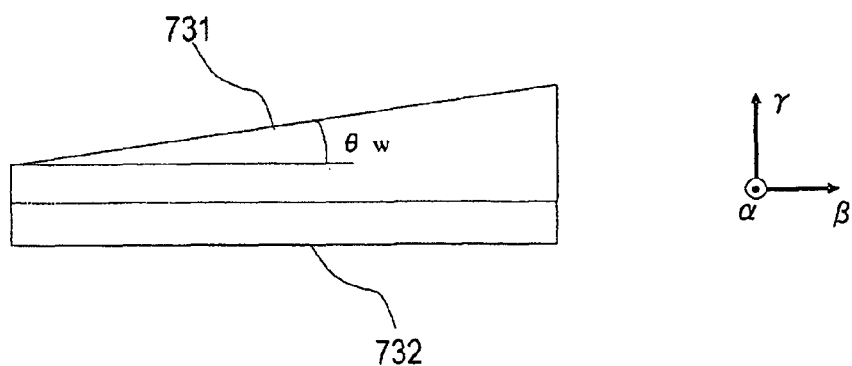

Next, a second embodiment is described below. FIGS. 25A, 25B are a perspective view and a sectional view, respectively, illustrating a wedge-shaped cylindrical lens 730.

The head-up display apparatus (HUD apparatus) 1 of the second embodiment is different from that of the first embodiment in substituting the wedge cylindrical lens 730 for the cylindrical lens 7. Different parts are explained below.

<Configuration and Action of Wedge-shaped Cylindrical Lens>

As shown in FIGS. 25A, 25B, in the wedge-shaped cylindrical lens 730, a cross section orthogonal to an action axis (α-direction) has a first intersecting line 731L and a second intersecting line 732L with the path-through side or surface (or outgoing side or surface) 731 and the incident side or surface 732, respectively. The first and second intersecting lines are not parallel with each other; thus, the cross section is shaped of a wedge. The first intersecting line 731L is referred to as an outgoing-side intersecting line; the second intersecting line 732L is referred to as an incident-side intersecting line.

In addition, FIG. 25A is made to correspond to the cylindrical lens 7 (refer to FIG. 3) of the first embodiment. Similarly with the first embodiment, the direction of the thickness of the lens will be designated as γ-direction; the direction in which it acts as a lens (action axis direction) will be designated as α-direction; and the direction in which it does not act as a lens (non-action axis direction) will be designated as β-direction. That is, the wedge-shaped cylindrical lens 730 is so constructed that: of two surfaces positioned at both ends in the γ-direction, one is a rectangular flat surface 731 and the other is a lens formation surface 732 approximating a curved surface of a cylindrical column.

Moreover, FIG. 25B illustrates a sectional shape in a β-γ plane of the wedge-shaped cylindrical lens 730. The wedge-shaped cylindrical lens 730 is formed so that only an outgoing-side intersecting line 731L is inclined with a predetermined wedge angle θw (for example, θw=2 degrees) against an incident-side intersecting line 732L. Note that the wedge angle θw is set within a range not to generate influence of chromatic aberration due to a prism effect in a display image 4 when the wedge-shaped cylindrical lens 730 is assembled into the HUD apparatus 1.

Figure 26:
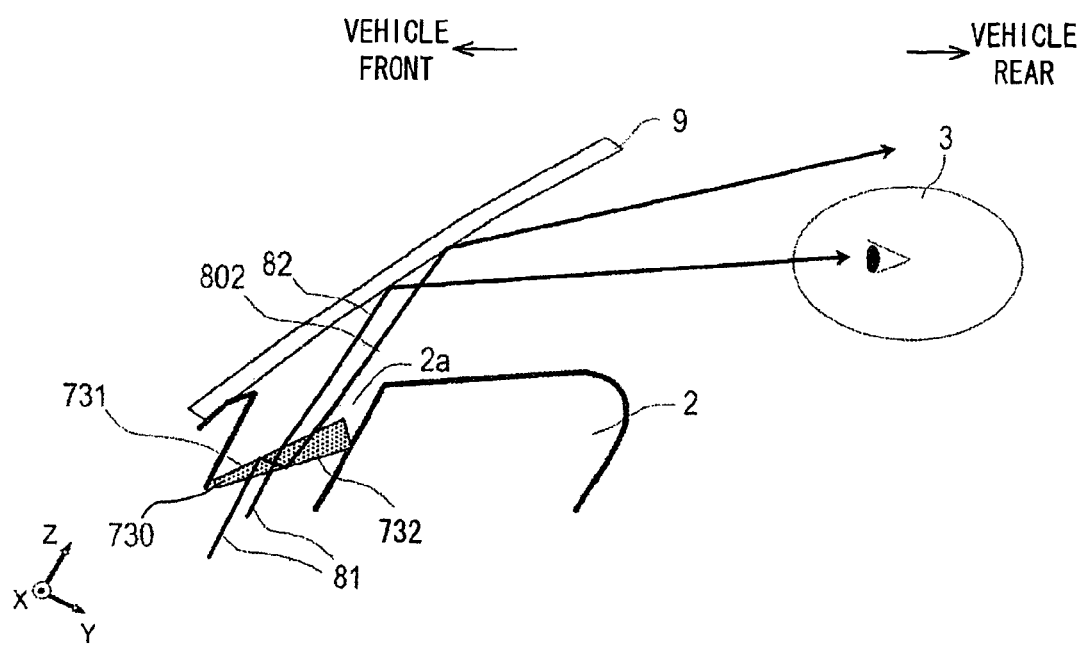
FIG. 26 is a first explanatory drawing illustrating how the wedge-shaped cylindrical lens is arranged.

Next, FIG. 26 illustrates a state where the wedge-shaped cylindrical lens 730 instead of the cylindrical lens 7 of the first embodiment is provided in the light guide portion 2a. As illustrated in FIG. 26, the wedge-shaped cylindrical lens 730 is arranged such that the pass-through side 731 faces frontward of the vehicle, and the thickness of the lens 730 increases rearward of the vehicle.

In such an arrangement of the wedge-shaped cylindrical lens 730, a part 82 of an image light 81 incident on the incident side 732 exits from the pass-through side 731 while not being reflected inside of the lens 730. The part 82 which passes through the lens 730 is then reflected by the windshield 9 to thereby reach an eye range 3. In contrast, the other part 802 of the image light 81 exits from the pass-through side 731 of the lens 730 as a ghost light which undergoes (multiple) reflections inside the lens 730 on the pass-through side 731 and the incident side 732. Compared with the part 82 of the image light 81 which undergoes no reflection inside the lens 730, the other part 802 of the image light 81 is directed to the more rear side of the vehicle. Thus, the other part 802 of the image light 81 is directed to an upper portion outside the eye range 3 after being reflected by the front windshield 9.

<Effect of Second Embodiment>

According to the HUD apparatus 1 of the present embodiment, a ghost image formed of ghost light can be prevented from being visually perceived as a virtual image by an occupant of the vehicle. This allows a display image 4 having sufficient visibility to be projected certainly.

Furthermore, with respect to the wedge-shaped cylindrical lens 730 provided at the light guide portion 2a, the inclination angle of the pass-through side 731 is greater than that of the incident side 732, e.g., with respect to the longitudinal direction or horizontal plane of the vehicle. More outside light reflected by the wedge-shaped cylindrical lens 730 can be interrupted by the instrument panel 2 at a front side of the vehicle.

According to the HUD apparatus 1 of the present embodiment, outside light can be more easily prevented from entering the eye range 3. Installation depth d of the wedge-shaped cylindrical lens 730 can be designated comparatively shallowly. Therefore, the HUD apparatus 1 of the present embodiment can be more easily installed in the vehicle.

<Modification of Second Embodiment>

Figure 27A:
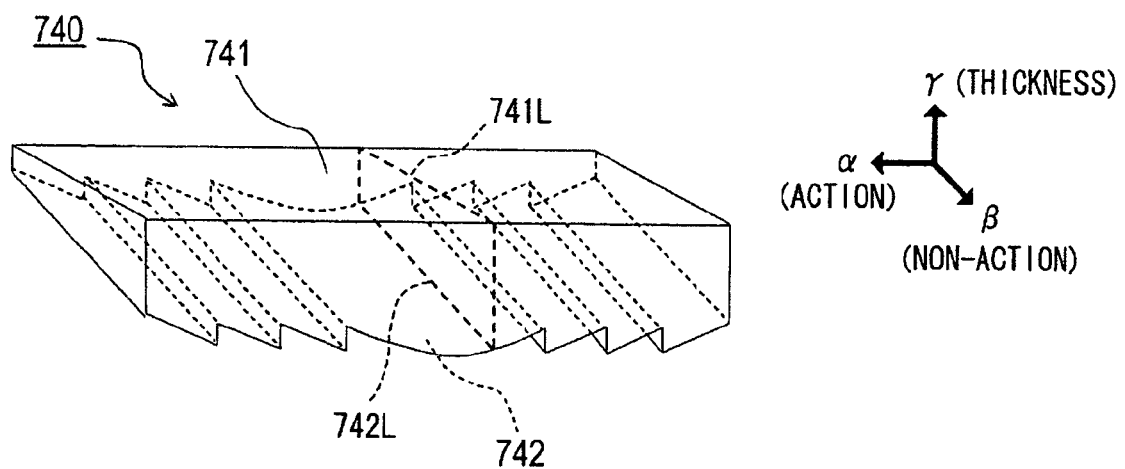
FIGS. 27A, 27B are a perspective view and a cross-sectional view of a wedge-shaped Fresnel lens according to a modification of the second embodiment.
Figure 27B:
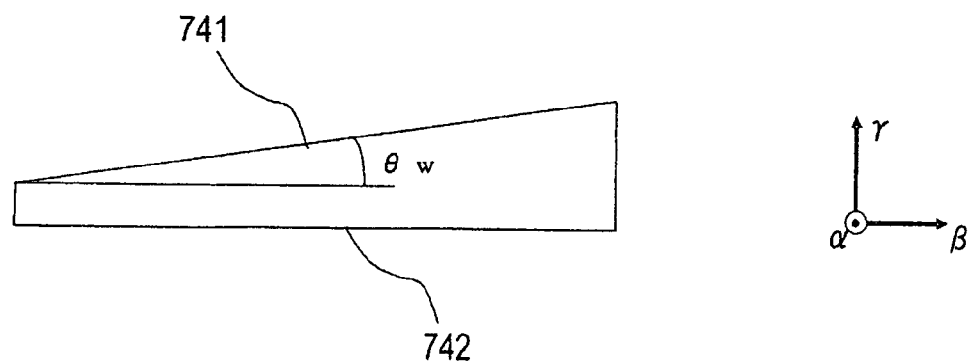

In the above embodiment, the wedge-shaped cylindrical lens 730 is used instead of the cylindrical lens 7. Without being limited, any other lens having a wedge-shaped cross section can be substituted. For example, as illustrated in FIGS. 27A, 27B, a wedge-shaped Fresnel lens 740 having a function equivalent to that of the wedge-shaped cylindrical lens 730 can be substituted. With respect to the wedge-shaped Fresnel lens 740, a cross section orthogonal to an action axis (α-direction) has an outgoing-side intersecting line 741L and an incident-side intersecting line 742L, both of which are not parallel with each other.

Figure 28:
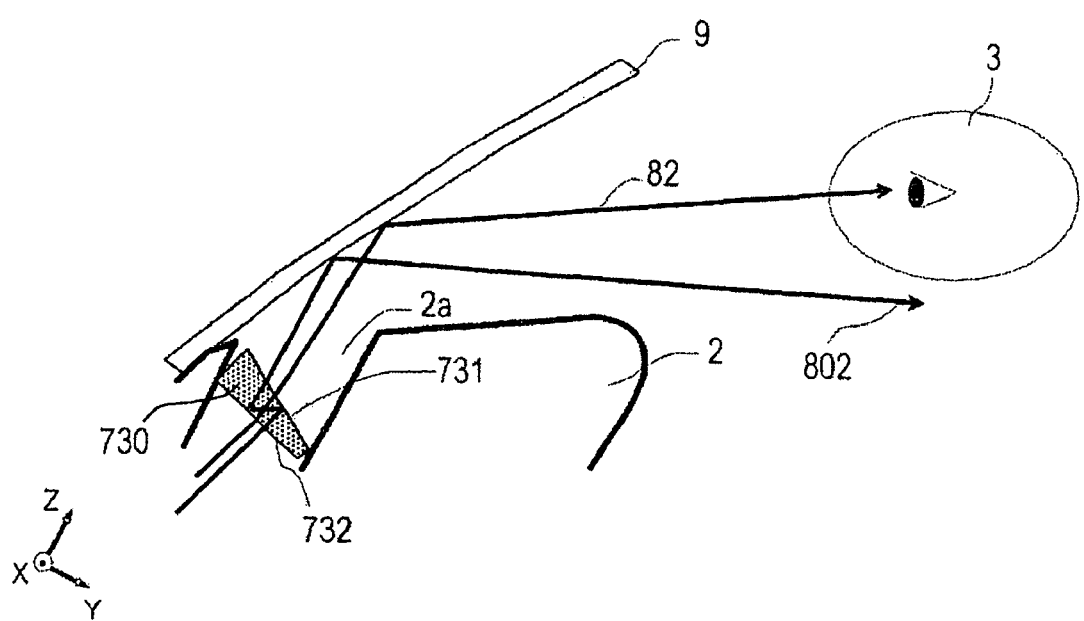
FIG. 28 is a second explanatory drawing illustrating how the wedge-shaped cylindrical lens is arranged.

In the above embodiment, the wedge-shaped cylindrical lens 730 is arranged such that the pass-through side 731 faces frontward of the vehicle, and the thickness of the lens 730 increases rearward of the vehicle. Without being limited to the above, as illustrated in FIG. 28, the wedge-shaped cylindrical lens 730 may be arranged such that the pass-through side 731 faces rearward of the vehicle, and the thickness of the lens 730 increases frontward of the vehicle. In such an arrangement, ghost light, which exits from the lens after undergoing multiple reflections inside the lens, is directed to a front side of the vehicle in comparison with the light 82 which exits from the pass-through side 731, without being reflected inside the lens. Thus, the ghost light is directed to a lower portion outside of the eye range 3 after being reflected by the front windshield 9.

(Aspects)

Aspects of the disclosure described herein are set out in the following clauses.

As an aspect of the disclosure, a head-up display apparatus is provided as follows. The apparatus is in a movable body having a reflecting element for transmitting and reflecting light. The apparatus allows an occupant of the movable body to visually perceive as a virtual image an image formed of image light reflected by the reflecting element. The apparatus includes the following. An optical element is configured to transmit light while performing an optical action on the light with respect to a preset certain direction. An image projecting element is configured to project an image light to a projecting side of the reflecting element through an incident side and an outgoing side of the optical element, wherein a main optical axis is defined as passing through a center of the projected image light. A light shielding element is configured to intercept part of outside light incident from a non-projecting side of the reflecting element toward the optical element. Herein, in the optical element, a cross section orthogonal to the certain direction has an incident-side intersecting line on the incident side and an outgoing-side intersecting line on the outgoing side. The optical element is so disposed that a normal to the incident-side intersecting line and a normal to the outgoing-side intersecting line are individually inclined with respect to the main optical axis of the image incident on the optical element so that outside light, which arrives at the optical element without being intercepted by the light shielding element and is reflected by the optical element, is thereby directed to outside a visual perception range, in which the image formed of the image light reflected by the reflecting element is allowed to be visually perceived by the occupant.

According to the head-up display apparatus, the light shielding element can therefore intercept without fail certain part of outside light entering from the non-image projection side of the reflecting element toward the optical element. The certain part of the outside light is to be reflected by the optical element to thereby enter an eye range if the light shielding element is not present. As a result, the head-up display apparatus can project a display image excellent in visibility without being affected by the outside light.

As an optional feature, in the head-up display apparatus, it is desirable that the incident-side intersecting line and the outgoing-side intersecting line are configured to be not parallel with each other. In such a configuration, (i) a first image light which exits after undergoing multiple reflections on the outgoing side and incident side of the optical element and (ii) a second image light which exits without undergoing multiple reflections are different from each other in an outgoing angle exiting from the outgoing side. This causes the reflecting element to reflect the former first image light to thereby direct to a point outside a visual perception area or eye range. That is, a ghost image formed of image light having undergone the multiple reflections can be prevented from being seen as a virtual image by the occupant of the vehicle. This can further provide a display image having better visibility.

In such a configuration, when an inclination angle of the incident side or outgoing side of the optical element is defined as an angle against a normal to a main optical axis of the image incident on the optical element, the inclination angle of the outgoing side can be arranged to be greater than that of the incident side. Thus, more outside light can be intercepted by the light shielding element. While outside light is easily prevented from reaching an eye range, the installation depth of the lens can be designated comparatively shallowly. The HUD apparatus 1 of the present embodiment can be more easily installed in the vehicle.

As an optional feature, it is desirable that the optical element is inclined about a first inclination axis along the certain direction. Further, it is desirable that the optical element is configured such that the certain direction approximately accords with the horizontal direction of the display image to thereby cause the image to undergo optical action only in the horizontal direction. The "approximately" above indicates that it is not required to make them exactly agree with each other. When the angle formed between the certain direction and the horizontal direction is within the range of ±20° or so, for example, that is acceptable.

Thus, as an optional feature, the optical element can be arranged such that the certain direction accords with a horizontal direction of the display image. When the optical element is disposed as mentioned above, the optical action of the optical element does not have influence in a plane orthogonal to the horizontal direction. Therefore, it is possible to reliably obtain such an inclination angle of the optical element that outside light reflected by the optical element is directed to outside the visual perception range.

In the head-up display apparatus, the optical element may be constructed of, for example, a cylindrical lens or a linear Fresnel lens.

Especially, the Fresnel lens can be reduced in thickness, and this contributes to further downsizing of the apparatus.

As an optional feature, in the head-up display apparatus, the optical element may be constructed of multiple lenses made of materials different in refractive index and chromatic dispersion. The multiple lenses may be combined to correct chromatic aberration. In this case, chromatic aberration produced by the optical action of the optical element can be corrected, and a virtual image excellent in visibility can be obtained.

As an optional feature, in the head-up display apparatus, it is desirable that the optical element should have an optical action of magnifying an image. Disposition of such an optical element makes it possible to equivalently lengthen an optical path of the image, and this contributes to downsizing of the apparatus.

As an optional feature, in the head-up display apparatus, it is desirable that one or more deflecting element for deflecting light should be disposed in the light path of the image light from the image projecting element to the optical element.

In this case, it is unnecessary to make the direction of projection from the image projecting element agree with the direction of the optical axis of the optical element. This enhances the degree of freedom in the layout of the image projecting element. When multiple deflecting elements are disposed, a limited space can be effectively utilized to lengthen the optical path of an image by bending the optical path of the image more than once. This contributes to further downsizing of the apparatus.

In this case, it is further desirable that at least one deflecting element should give an optical action to light. Hereafter, a deflecting element that gives an optical action to light, as mentioned above, will be especially referred to as a functionalized deflecting element.

Disposition of such a functionalized deflecting element supplements an optical action given to an image by the optical element; therefore, a virtual image favorable in visibility can be obtained.

Further, it is desirable that the optical action given by at least one functionalized deflecting element should be magnification of an image.

In this case, the magnifying action given to an image by the optical element is supplemented; therefore, a virtual image more favorable in visibility can be obtained.

As an optional feature, in the head-up display apparatus, it is desirable that at least one functionalized deflecting element having an optical action is configured as follows. A certain point on the incident side (reflection surface) of the deflecting element is defined as a point at which the main optical axis of the image incident. The normal at the certain point on the incident side is inclined at an inclination angle against the main optical axis of the image. The inclination angle is designated to cancel out the distortion in a virtual image arising from the inclined disposition of the optical element.

In this case, the distortion in the virtual image arising from the inclined disposition of the optical element having an optical action is canceled out by the distortion arising from the inclined disposition of the functionalized deflecting element having an optical action. As a result, a virtual image favorable in visibility with less distortion can be obtained.

Further, it is desirable that one functionalized deflecting element is disposed in a light path before reaching the optical element and the one functionalized deflecting element is inclined at an angle about a second inclination axis positioned in the same plane as the first inclination axis. Disposition in the light path before reaching the optical element refers to such disposition that outgoing light from the functionalized deflecting element becomes light incident on the optical element.

Further, it is desirable that the functionalized deflecting element should be so disposed that an angle formed between the first inclination axis and the second inclination axis in the same plane is within the range of ±20° or so. Especially, it is more desirable that the functionalized deflecting element should be so disposed that the first inclination axis and the second inclination axis are parallel with each other.

In this case, it is easy to set such an inclination angle that distortion in a virtual image arising from the inclined disposition of the optical element is canceled out and to dispose the functionalized deflecting element.

Further, a wasted space for installing the apparatus is eliminated, and thus the apparatus can be reduced in size.

As an optional feature, in the head-up display apparatus, at least one deflecting element having an optical action may have such a shape as to give an optical action of canceling out distortion in a virtual image arising from the shape of at least either the optical element or the reflecting element.

In this case, the deflecting element can be designed to follow the optical action of the optical element or the reflecting element, and a virtual image favorable in visibility with far less distortion can be obtained.

Further, the head-up display apparatus may be so constructed that the following is implemented: it includes an enclosure having a projecting element built therein; the light shielding element also functions as an inner wall forming an opening in the enclosure; and the optical element is so disposed that the arrival of part of outside light is prevented by the light shielding element.

In this case, the light shielding element also functions as part of the enclosure having the projecting element built therein; therefore, a number of components can be reduced. As a result, the manufacturing cost of the apparatus can be reduced.

Yet further, in the head-up display apparatus, the optical element may also function as a cover for shielding the interior of the enclosure from dust.

In this case, therefore, a number of components can be further reduced. As a result, the manufacturing cost of the apparatus can be further reduced.

It will be obvious to those skilled in the art that various changes may be made in the above-described embodiments of the present invention. However, the scope of the present invention should be determined by the following claims.

What is claimed is:

1. A head-up display apparatus for a vehicle of which a windshield functions as a reflecting element for transmitting and reflecting light, the apparatus allowing a driver of the vehicle to visually perceive as a virtual image a perceived image reflected by the windshield, the apparatus comprising:
a light shielding element configured to intercept part of outside light incident from an exterior external to the vehicle via the windshield into a compartment of the vehicle;
an image projecting element configured to project image light to form the perceived image, the projected image light having a main optical axis that is defined as passing through a center of the projected image light;
a deflecting element provided in a light path of the image light from the image projecting element towards the windshield, the deflecting element deflecting the image light from the image projecting element; and
an optical element configured to
transmit the image light deflected by the deflecting element to a projecting side of the windshield through an incident side and an outgoing side of the optical element,
perform a predetermined optical converging action on the transmitted image light with respect to only a single preset certain direction that is one of two directions orthogonal to a direction of a thickness of the optical element, the optical converging action being performed for magnifying the virtual image, and
incline by a predetermined first inclination angle about a first inclination axis that is parallel with the preset certain direction such that not-intercepted outside light, which is defined as an outside light reaching the optical element without being intercepted by the light shielding element, is reflected by the optical element so as to be uniquely identified within a plane that is orthogonal to the preset certain direction,
the inclining by the predetermined first inclination angle in the optical element
(i) causing the not-intercepted outside light to be directed to outside a visual perception range of the driver, the visual perception range where the perceived image formed of the image light reflected by the reflecting element to be visually perceived by the driver, and
(ii) enabling an occurrence of a predetermined first distortion along the preset certain direction of the virtual image,
wherein:
the deflecting element is so disposed that a normal to an image-incident side of the deflecting element on the main optical axis of the image light incident on the deflecting element inclines by a second inclination angle against the main optical axis of the image light about a second inclination axis that is parallel with the preset certain direction; and
the predetermined second inclination angle is provided so as to cancel out the occurrence of the predetermined first distortion in the virtual image enabled by the inclining by the predetermined first inclination angle in the optical element.

2. The head-up display apparatus according to claim 1, wherein:
in the optical element, a cross section orthogonal to the preset certain direction has an incident-side intersecting line on the incident side and an outgoing-side intersecting line on the outgoing side; and
the optical element performing the optical converging action is arranged such that a normal to the incident side at an incident position in the incident-side intersecting line and a normal to the outgoing side at an outgoing point in the outgoing-side intersecting line are individually inclined with respect to the main optical axis of the image light incident on the optical element.

3. The head-up display apparatus according to claim 2, wherein
the optical element is configured such that the cross section orthogonal to the preset certain direction is wedge shaped to thereby cause the incident-side intersecting line to be inclined at a predetermined angle to the outgoing-side intersecting line.

4. The head-up display apparatus according to claim 1 wherein the preset certain direction is a horizontal direction of the perceived image.

5. The head-up display apparatus according to claim 1, wherein
the preset certain direction is on a horizontal plane of the vehicle, the horizontal plane of the vehicle being parallel with a surface on which the vehicle travels.

6. The head-up display apparatus according to claim 1, wherein
the optical element includes a cylindrical lens.

7. The head-up display apparatus according to claim 1, wherein
the optical element includes a Fresnel lens.

8. The head-up display apparatus according to claim 1, wherein
the deflecting element further has a function of magnifying an image formed of the image light from the image projecting element.

9. The head-up display apparatus according to claim 1, wherein:
the deflecting element is disposed in the light path before reaching the optical element; and
the second inclination axis about which the deflecting element inclines is positioned in a same plane as a plane of the first inclination axis along the preset certain direction.

10. The head-up display apparatus according to claim 1, wherein
the deflecting element is being further configured to have such a shape as to cancel out a distortion in the virtual image enabled by a shape of the windshield functioning as the reflecting element.

11. The head-up display apparatus according to claim 1, further comprising:
an enclosure configured to contain the image projecting element and have an opening,
wherein:
the optical element is so disposed that the light shielding element prevents the part of the outside light from arriving at the optical element; and
the light shielding element is configured to serve as an inner wall that forms the opening in the enclosure.

12. The head-up display apparatus of claim 11, wherein
the optical element is configured to also serve as a cover for shielding an interior of the enclosure from dust.

13. The head-up display apparatus of claim 1, wherein
the light shielding element is served as by an instrument panel of the vehicle.

* * * * *